US011375242B1

(12) United States Patent
 Said

(10) Patent No.: US 11,375,242 B1
(45) Date of Patent: Jun. 28, 2022

(54) COMPRESSION OF BITSTREAM INDEXES FOR PARALLEL ENTROPY CODING

(71) Applicant: QUALCOMM Incorporated, San Diego, CA (US)

(72) Inventor: Amir Said, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/160,315

(22) Filed: Jan. 27, 2021

(51) Int. Cl.
 *H04N 19/91* (2014.01)
 *H04N 19/44* (2014.01)
 *H04N 19/70* (2014.01)

(52) U.S. Cl.
 CPC ............. *H04N 19/91* (2014.11); *H04N 19/44* (2014.11)

(58) Field of Classification Search
 CPC ............................... H04N 19/91; H04N 19/44
 USPC .................................................... 375/240.25
 See application file for complete search history.

(56) References Cited

U.S. PATENT DOCUMENTS

| 7,199,735 B1* | 4/2007 | Wen ....................... H04N 19/91 341/107 |
| 8,687,654 B1* | 4/2014 | Lundin ............ H04N 21/23605 370/473 |
| 2011/0235699 A1* | 9/2011 | Huang ................. H03M 7/4006 375/240.02 |
| 2014/0035938 A1* | 2/2014 | Wang ............... H04N 21/42653 345/520 |
| 2018/0167641 A1* | 6/2018 | Schierl ................. H04N 19/107 |
| 2018/0302690 A1* | 10/2018 | Tran ....................... H04N 21/44 |
| 2019/0190974 A1* | 6/2019 | Qian ................... H04L 65/4076 |

* cited by examiner

*Primary Examiner* — Albert Kir
(74) *Attorney, Agent, or Firm* — Polsinelli

(57) ABSTRACT

Techniques are described herein for video coding, including compression of bitstream indexes for neural network based video coding and/or parallel entropy coding. One example includes obtaining a sequence of video data, identifying positions in the sequence of video data associated with entry points for individually entropy codable parcels of a parallel entropy codable sequence of video data, and generating the parallel entropy codable sequence of video data. An index is then generated for the parallel entropy codable sequence of video data, the index identifying the individually entropy codable parcels within the parallel entropy codable sequence of video data.

28 Claims, 20 Drawing Sheets

COMPRESSION OF BITSTREAM INDEXES FOR PARALLEL ENTROPY CODING

FIELD OF THE DISCLOSURE

The present disclosure generally relates to image and video coding, including encoding (or compression) and decoding (decompression) of images and/or video. Aspects of the present disclosure relate to techniques for parallel entropy coding of images and/or video.

BACKGROUND

Many devices and systems allow video data to be processed and output for consumption. Digital video data includes large amounts of data to meet the demands of consumers and video providers. For example, consumers of video data desire high quality video, including high fidelity, resolutions, frame rates, and the like. As a result, the large amount of video data that is required to meet these demands places a burden on communication networks and devices that process and store the video data.

Video coding techniques may be used to compress video data. A goal of video coding is to compress video data into a form that uses a lower bit rate, while avoiding or minimizing degradations to video quality. With ever-evolving video services becoming available, encoding techniques with better coding efficiency are needed.

SUMMARY

Systems and techniques are described for coding (e.g., encoding and/or decoding) image and/or video content with parallel entropy coding. Conventional approaches to data and media coding (also referred to as media compression) is to code all information in a single bitstream that is processed sequentially. For many demanding applications, such as high-definition video coding, the single bitstream can create a data bottleneck. Standards that use entropy coding, such as High Efficiency Video Coding (HEVC) and Versatile Video Coding (VVC), use the single bitstream structure to perform multiple processing passes on data that is used for other parts of the bitstream, such that parallel structures break the coding systems that rely on the previously processed portions of the single bitstream. Conventional modifications to such coding systems are thus not feasible, since parcels of such a bitstream are not independently codable due to the interdependencies (e.g., predictive coding, etc.) between different parts of the bitstream.

Examples described herein use compression techniques to extensively parallelize entropy coding with new coding methods. Additionally, examples enable wide scale parallelization by segmenting a bitstream into small blocks with independent entry points (e.g., points of a data stream which are not dependent on data from other portions of the stream outside the block) such that the blocks can be concurrently encoded and decoded. Examples described herein enable such parallelization with systems to limit encoding index overhead and computational complexity associated with coding extra index information.

In one illustrative example, a method of processing video data is provided. The method includes: obtaining a sequence of video data; identifying positions in the sequence of video data associated with entry points for individually entropy codable parcels of a parallel entropy codable sequence of video data; generating the parallel entropy codable sequence of video data; and generating an index for the parallel entropy codable sequence of video data, the index identifying the individually entropy codable parcels within the parallel entropy codable sequence of video data.

In another example, a non-transitory computer-readable medium is provided that has stored thereon instructions that, when executed by one or more processors, cause the one or more processors to: obtain a sequence of video data; identify positions in the sequence of video data associated with entry points for individually entropy codable parcels of a parallel entropy codable sequence of video data; generate the parallel entropy codable sequence of video data; and generate an index for the parallel entropy codable sequence of video data, the index identifying the individually entropy codable parcels within the parallel entropy codable sequence of video data.

In another example, an apparatus for encoding video data is provided. The apparatus comprises: means for obtaining a sequence of video data; means for identifying positions in the sequence of video data associated with entry points for individually entropy codable parcels of a parallel entropy codable sequence of video data; means for generating the parallel entropy codable sequence of video data; and means for generating an index for the parallel entropy codable sequence of video data, the index identifying the individually entropy codable parcels within the parallel entropy codable sequence of video data.

In another example, an apparatus for encoding video data is provided. The apparatus comprises: memory; and one or more processors coupled to the memory, the one or more processors configured to: obtain a sequence of video data; identify positions in the sequence of video data associated with entry points for individually entropy codable parcels of a parallel entropy codable sequence of video data; generate the parallel entropy codable sequence of video data; and generate an index for the parallel entropy codable sequence of video data, the index identifying the individually entropy codable parcels within the parallel entropy codable sequence of video data.

In some aspects, the method, apparatuses, and computer-readable medium described above further operate where the entry points are identified at least in part by performing a bisection enumeration of the sequence of video data.

In some aspects, the method, apparatuses, and computer-readable medium described above further operate where the parallel entropy codable sequence of video data is generated at least in part by performing a bisection search that encodes information associated with the individually entropy codable parcels with data from the sequence of video data determined by the positions to generate the individually entropy codable parcels.

In some aspects, the method, apparatuses, and computer-readable medium described above further operate where, to perform the bisection enumeration, the one or more processors are configured to: bisect the sequence of video data to identify an initial position of the positions, wherein the initial position is associated with a first entry point and subsequences divided by the initial position; and bisect tiers of subsequences to identify a remaining portion of the positions.

In some aspects, the method, apparatuses, and computer-readable medium described above further operate where the individually entropy codable parcels include corresponding data from the sequence of video data determined by the positions, and the information about the individually entropy codable parcels.

In some aspects, the method, apparatuses, and computer-readable medium described above further operate where the information about the individually entropy codable parcels is information about a magnitude of a binary representation of the corresponding data from the sequence of video data.

In some aspects, the method, apparatuses, and computer-readable medium described above further operate where a difference between a largest parcel and a smallest parcel of the individually entropy codable parcels is less than a threshold difference.

In some aspects, the method, apparatuses, and computer-readable medium described above further operate where, to generate the parallel entropy codable sequence, the one or more processors are configured to: identify a number of parcels to define a set of individually entropy codable parcels from a first parcel to a last parcel having sizes between a minimum parcel size and a maximum parcel size, wherein parcel sizes of the number of parcels sums to a size of the parallel entropy codable sequence.

In some aspects, the method, apparatuses, and computer-readable medium described above further operate where, to generate the parallel entropy codable sequence of video data, the one or more processors are configured to initialize a stack in the memory including a number of parcels and a magnitude of a binary representation of corresponding data for the number of parcels; and generate the parallel entropy codable sequence of video data at least in part by performing following operations until the stack is empty: analyze the stack to retrieve current interval sets; select a parcel by defining a new index for the parcel as an average of the current interval sets; use bisection to encode bits of the parcel using the average of the current interval sets; update the stack with sets from the first parcel to the parcel when the parcel is not the first parcel; and update the stack with sets from the parcel to the last parcel when the parcel using is not the last parcel.

In some aspects, the method, apparatuses, and computer-readable medium described above further operate where the stack is further initialized with a universal codeword set.

In some aspects, the method, apparatuses, and computer-readable medium described above further operate where, to use bisection to encode the bits of the parcel, the one or more processors are configured to: initialize a first variable to the minimum parcel size, a second variable to the maximum parcel size, and a third variable to an average of the minimum parcel size and the maximum parcel size; access a value for a magnitude of a binary representation of the parcel; encode a first bit when the third variable is less than or equal to the value; encode a second bit when the third variable is greater than the value; and update the third variable to a new average of the first variable and the second variable.

In some aspects, the method, apparatuses, and computer-readable medium described above further operate where the one or more processors are further configured to: define parcels of the individually entropy codable parcels as forward parcels or backwards parcels; wherein a corresponding parcel pair includes a corresponding forward parcel and a corresponding backwards parcel defined using a single shared entry point in the index.

In some aspects, the method, apparatuses, and computer-readable medium described above further operate where the index includes N/2 entry points when a number of the individually entropy codable parcels is even, and the index includes [(N−1)/2]+1 entry points when the number of the individually entropy codable parcels is odd.

In some aspects, the method, apparatuses, and computer-readable medium described above further operate where the one or more processors are further configured to: store the individually entropy codable parcels in the memory structured as a file having a file structure including the index and a plurality of parts, each part including a plurality of blocks, each block including a plurality of sections, and each section including a forward parcel structure and a backward parcel structure for the corresponding forward parcel and the corresponding backwards parcel of the corresponding parcel pair.

In some aspects, the method, apparatuses, and computer-readable medium described above further operate where the one or more processors are further configured to transmit the file including the index and the individually entropy codable parcels.

In some aspects, the method, apparatuses, and computer-readable medium described above further operate where the index identifies the individually entropy codable parcels using the entry points as identified following encoding of the sequence of video data in an encoded bitstream.

In some aspects, the method, apparatuses, and computer-readable medium described above further operate where the index identifies the individually entropy codable parcels including identifying a bit length and a position of each parcel in an encoded video bitstream generated from the sequence of video data.

In some aspects, the method, apparatuses, and computer-readable medium described above further comprising: a transmitter coupled to the one or more processors and configured to transmit the sequence of video data as entropy encoded using the index and the individually entropy codable parcels.

In some aspects, the method, apparatuses, and computer-readable medium described above further comprising a display coupled to the one or more processors and configured to display images of the sequence of video data.

In some aspects, the apparatus comprises a mobile device (e.g., a mobile telephone or so-called "smart phone", a tablet computer, or other type of mobile device), a wearable device, an extended reality device (e.g., a virtual reality (VR) device, an augmented reality (AR) device, or a mixed reality (MR) device), a personal computer, a laptop computer, a video server, a television, a vehicle (or a computing device of a vehicle), or other device. In some aspects, the apparatus includes at least one camera for capturing one or more images or video frames. For example, the apparatus can include a camera (e.g., an RGB camera) or multiple cameras for capturing one or more images and/or one or more videos including video frames. In some aspects, the apparatus includes a display for displaying one or more images, videos, notifications, or other displayable data. In some aspects, the apparatus includes a transmitter configured to transmit one or more video frame and/or syntax data over a transmission medium (e.g., an antenna to transmit over a wireless medium) to at least one device. In some aspects, the processor includes a neural processing unit (NPU), a central processing unit (CPU), a graphics processing unit (GPU), or other processing device or component.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
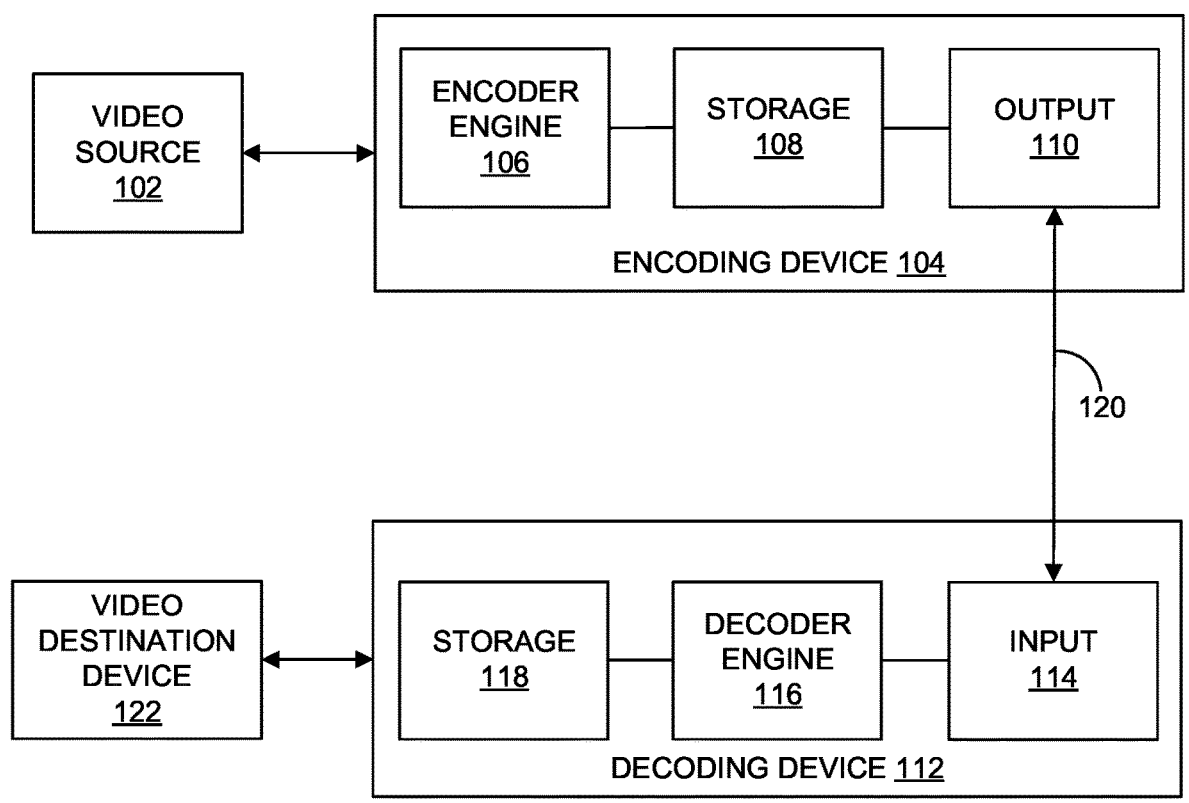
FIG. 1 is a block diagram illustrating an example of an encoding device and a decoding device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the application as set forth in the appended claims.

Digital video data can include large amounts of data, particularly as the demand for high quality video data continues to grow. For example, consumers of video data typically desire video of increasingly high quality, with high fidelity, resolution, frame rates, and the like. However, the large amount of video data required to meet such demands can place a significant burden on communication networks as well as on devices that process and store the video data.

Video coding devices implement video compression techniques to encode and decode video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data), and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, and/or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill). Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. For intra-prediction modes, a video encoder may form the predicted block using spatial prediction techniques based on data from previously encoded neighboring blocks within the same picture.

The video encoder may determine a prediction error (also referred to as a residual). For example, the prediction error can be determined as the difference between the image sample or pixel values in the block being encoded and the predicted block. The video encoder may also apply a transform to the prediction error (e.g., a discrete cosine transform (DCT) or other suitable transform) to generate transform coefficients. After transformation, the video encoder may quantize the transform coefficients. The quantized transform coefficients and motion vectors may be represented using syntax elements, and, along with control information, form a coded representation of a video sequence. The video encoder can then entropy code syntax elements, thereby further reducing the number of bits needed for their representation. In many video coding systems, entropy coding is the final process of data compression, when information is translated into the bits that form the compressed bitstream that is to be used for storage or transmission.

A video decoder may, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

Various techniques can be used to code video data. For instance, video coding can be performed according to a particular video coding standard or coding process. Example video coding standards include high-efficiency video coding (HEVC), advanced video coding (AVC), moving picture experts group (MPEG) coding, and versatile video coding (VVC). Video coding often uses prediction methods such as inter-prediction or intra-prediction, which take advantage of redundancies present in video images or sequences.

A common goal of video coding techniques is to compress video data into a form that uses a lower bit rate, while avoiding or minimizing degradations in the video quality. HEVC, AVC, VVC, and many other such coding standards, however, rely on single threaded processing as part of prediction methods. Simply breaking a stream into multiple parcels results in the parcels being uncodable using such coding standards. The uncodability can be due to the impact of prediction methods and other such coding techniques that use data from one part of a bitstream (e.g., that may be in a separate parcel if the bitstream is broken up) for coding.

Wide scale parallelization (e.g., using many coding elements, such as tens, hundreds, or more encoding or decoding processors) is therefore possible only if the video data is segmented into blocks that can be concurrently encoded and decoded. Such parallelization creates two issues related to compression and computational efficiency. One problem is related to limiting overhead for encoding indexes associated with the independently codable data segments (e.g., blocks, parcels, etc.). Another problem is dealing with the computation complexity of coding extra index information. Examples describe herein provide an indexing structure with limited computational complexity and low-overhead for indexing. The examples enable improved device operation for video coding with wide scale parallelization to improve coding speeds and avoid single bitstream bottlenecks, while limiting the overhead associated with the improvements from parallel coding.

Systems, apparatuses, methods (also referred to herein as "processes"), and computer-readable media (collectively referred to herein as "systems and techniques") are described herein for parallel entropy coding of video data. The systems and techniques provide for parallel entropy coding of video data at least in part by segmenting the video data and adding additional information (e.g., overhead data) to the video data when encoding the segmented video data as individually entropy codable parcels. The systems and techniques can use two nested applications of bisection, referred to herein as nested bisection coding. Beginning with encoded video data to be entropy coded, a first bisection application divides the encoded video data into two subsequences. In some examples, the point of division for the two subsequences can be pseudorandom, based on characteristics of the data, such that the point of division will become an entry point to the encoded video stream when the encoding is complete. The two subsequences can then be further divided in tiers into additional subsequences, with each additional division having an associated position associated with what will become an entry point in the encoded video data.

A second bisection application adds additional information to each subsequence of the video data determined by the positions from the first bisection application described above. Such additional information can be information about the magnitude of the number in the subsequence associated with the video data (e.g., the portion of the subsequence of video data between two positions, or the portion of the subsequence of video data included in an individually entropy codable parcel). The overhead data is encoded with data from the original sequence of video data to generate an individually entropy codable parcel. The parcels together make up a parallel entropy codable sequence of video data, with entry points associated with positions where a decoder can know the appropriate state to perform parallel decoding.

In some examples, the systems and techniques can generate an index to store information that can be used by a decoder to identify the individually entropy codable parcels (e.g., entry point positions, parcel positions and lengths, etc.). The index can be stored or transmitted with the parallel entropy codable sequence of video data (e.g., made up of many individually entropy codable parcels). The index can be the first item to be decoded to allow decoder units to perform parallel decoding of the video data. Additional details are provided below with respect to the various figures.

FIG. 1 is a block diagram illustrating an example of a system 100 including an encoding device 104 and a decoding device 112 that describe, at a high level, entropy coding processes. The example system 100 can use parallel structures described below (e.g., in FIGS. 3 and 6) for parallel entropy encoding or decoding in accordance with examples described herein. Parallel coding structures and indexing can improve the operation of a system 100 when compared with a single thread processing system as described above.

In system 100, the encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The video data from the video source 102 may include one or more input pictures. Pictures may also be referred to as "frames." A picture or frame is a still image that, in some cases, is part of a video. In some examples, data from the video source 102 can be a still image that is not a part of a video. A picture may include three sample arrays, denoted $S_L$, $S_{Cb}$, and $S_{Cr}$. $S_L$ is a two-dimensional array of luma samples, $S_{Cb}$ is a two-dimensional array of $C_b$ chrominance samples, and $S_{Cr}$ is a two-dimensional array of Cr chrominance samples. Chrominance samples may also be referred to herein as "chroma" samples. A pixel can refer to a location within a picture that includes a luma component, a Cb component, and a Cr component. In other instances, a picture may be monochrome and may only include an array of luma samples.

The encoder engine 106 (or encoder) of the encoding device 104 encodes the video data to generate an encoded video bitstream. In some examples, an encoded video bitstream (or "video bitstream" or "bitstream") is a series of one or more coded video sequences. The encoder engine 106 generates coded representations of pictures by partitioning each picture. Different partitions can contain luma and chroma sample arrays. In some examples, the luma and chroma arrays can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information.

As part of entropy coding, the encoder engine 106 predicts each PU using a prediction mode. The prediction unit or prediction block is then subtracted from the original video data to get residuals (described below). A prediction mode may be signaled inside the bitstream using syntax data. A prediction mode may include intra-prediction (or intra-picture prediction) or inter-prediction (or inter-picture prediction). The decision whether to code a picture area using inter-picture or intra-picture prediction may be made, for example, at the CU level.

The encoding device 104 may then perform transformation and quantization. For example, following prediction, the encoder engine 106 may calculate residual values corresponding to prediction. Residual values may comprise pixel difference values between the current block of pixels being coded and the prediction block used to predict the current block (e.g., the predicted version of the current block). For example, after generating a prediction block (e.g., using inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 may send the units making up the encoded video bitstream data over the communications link 120 to the decoding device 112 of the receiving device. The input 114 of the decoding device 112 may receive the units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data. The storage 108 can also include a decoded picture buffer (DPB) for storing reference pictures for use in inter-prediction.

The encoder engine 106 and decoder engine 116 (described in more detail below) may be configured to operate according parallel coding operations described herein, with independently entropy codable parcels each coded and decoded independently using parcel details in an index The input 114 of the decoding device 112 receives the encoded video bitstream data and may provide the video bitstream data to the decoder engine 116, or to storage 118 for later use by the decoder engine 116. The input 114 of the decoding device 112 receives the encoded video bitstream data and may provide the video bitstream data to the decoder engine 116, or to storage 118 for later use by the decoder engine 116. For example, the storage 118 can include a DPB for storing reference pictures for use in inter-prediction. The receiving device including the decoding device 112 can receive the encoded video data to be decoded via the storage 108.

The encoded video data may be modulated according to a communication standard, such as a wireless communication protocol, and transmitted to the receiving device. The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels in accordance with the coding structures used for a parcel of data as described below.

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

Figure 2:
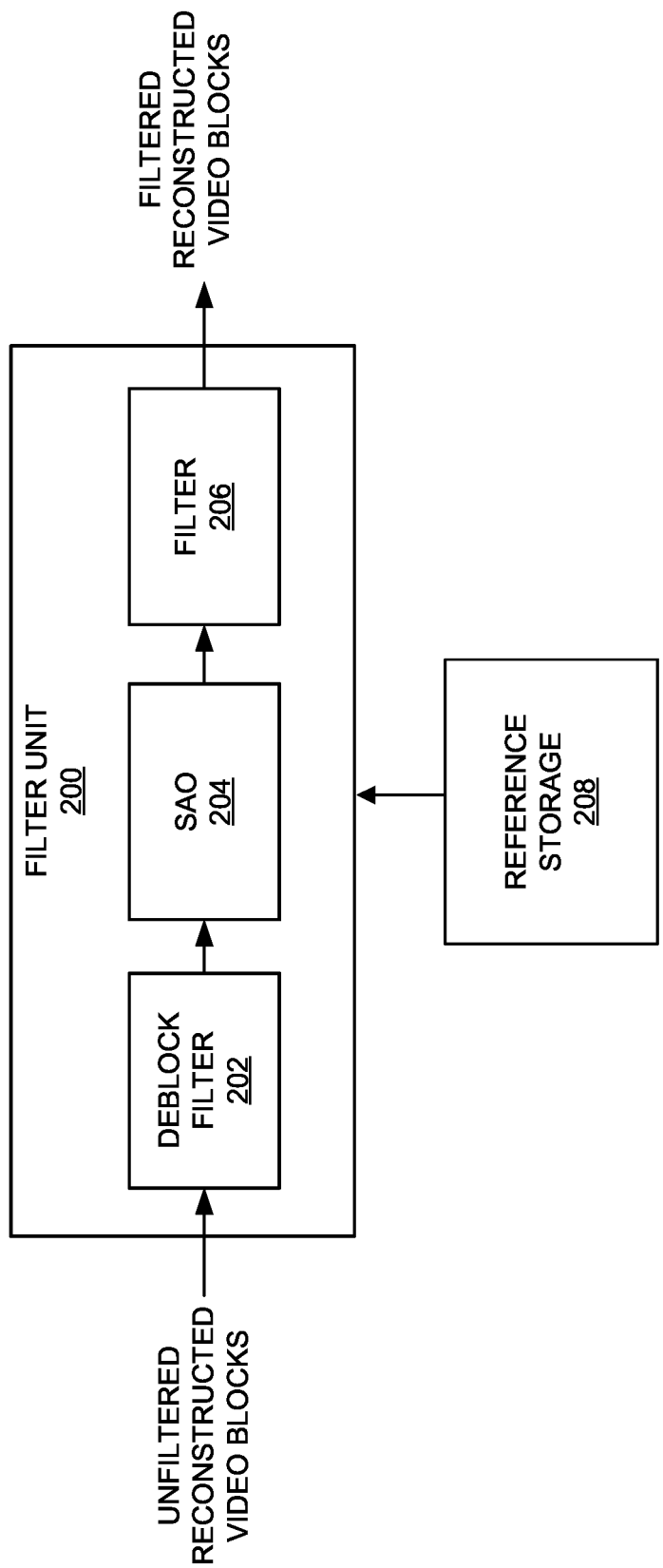
FIG. 2 is a diagram illustrating an example implementation of a filter unit for performing the techniques of this disclosure.

FIG. 2 is a diagram illustrating an example implementation of a filter unit 200 including placing reference pictures in a reference picture storage 208 that can be identified by reference picture table. Filter unit 200 can be part of any encoding element (e.g., encoding elements 310A-N described below) or decoding element (e.g., decoding elements 340A-N described below), and can therefore be used for parallel entropy coding in accordance with examples described herein.

The filter unit 200 as shown includes a deblocking filter 202, a sample adaptive offset (SAO) filter 204, and a general filter 206, but may include fewer filters and/or may include additional filters than those shown in FIG. 2. Additionally, the particular filters shown in FIG. 2 may be implemented in a different order. Other loop filters (either in the coding loop or after the coding loop) may also be used to smooth pixel transitions or otherwise improve the video quality. When in the coding loop, the decoded video blocks in a given frame or picture are then stored in a decoded picture buffer (DPB), which stores reference data as part of reference picture storage 208. The DPB (e.g., reference picture storage 208) may be part of or separate from additional memory that stores decoded video for later presentation on a display device, such as a display of video destination device 122 of FIG. 1.

If system 100 and filter unit 200 are single threaded processing systems, they can use significant prediction to improve compression and coding performance. Systems described herein that use multiple filter units, however, can greatly increase coding speed at the cost of indexing overhead and parallel coding hardware (e.g., multiple filter units 200 in an encoding device 104 or decoding device 112). For parallel coding, a decoder is configured to reach the same state the encoder had when it coded a particular element. Thus, random access (e.g., parallel processing of different parts of a video stream) can only be achieved, to some degree, by splitting the bitstream and creating access positions (e.g., entry points) corresponding to where the encoder and decoder states are reset to a known value. Such entry points identify a place in a bitstream where the subsequent portions of the bitstream become independently entropy codable. By configuring such entry points and somewhat regular positions within a bitstream, the data between the entry points become such independently entropy codable sections of the bitstream, which are referred to herein as data parcels, parcels, or independently entropy codable parcels. Additional details related to the structure and indexing for such parcels are described in detail below.

Figure 3:
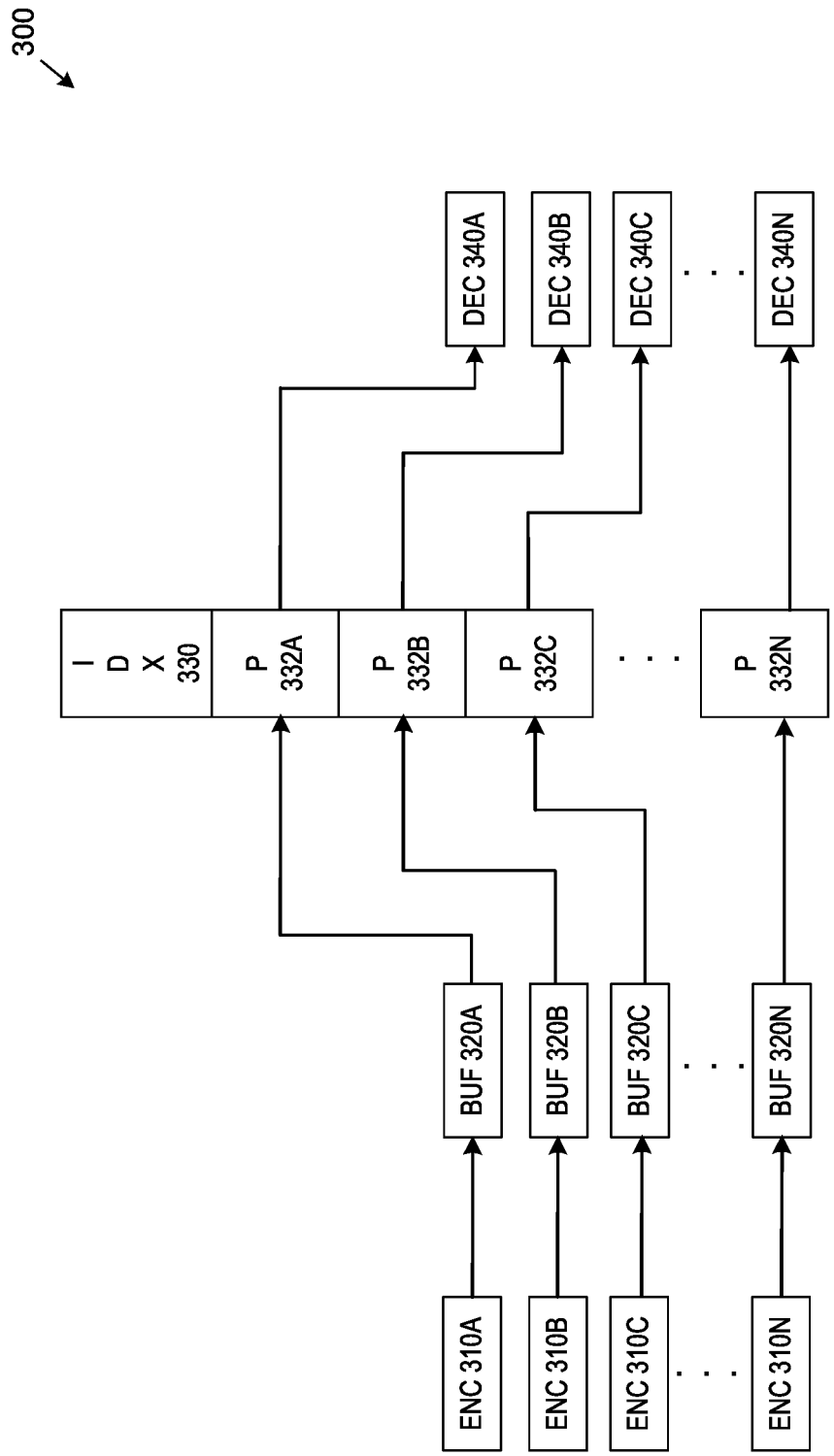
FIG. 3 is a diagram illustrating aspects of parallel coding for independently entropy codable parcels, in accordance with examples described herein.

FIG. 3 is a diagram illustrating aspects of parallel coding for independently entropy codable parcels in accordance with examples described herein. FIG. 3 shows a structure 300, with multiple encoder units 310A, 310B, 310C, and 310N, each configured to perform parallel encoding of independently entropy codable parcels. Buffers 320A, 320B, 320C, and 320N correspond to the encoder units, and can buffer data for storage, transmission, or any processing used to generate index 330. Each encoder unit and buffer pair outputs a corresponding parcel during a single parallel processing operation, with the parcels shown as parcel 332A, 332B, 332C, and 332N. Each encoder unit can process any number of parcels for a given sequence of video data. For example, if a sequence of video data is divided into 10,000 parcels, and a parallel encoding system uses 50 encoder units, each encoder unit can generate an average of 200 independently entropy codable parcels. During operation, if some encoder units encode longer or shorter parcels, a unit may encode more or fewer parcels than other encoding units, depending on the structure of the system.

The structure 300 supports parallel entropy encoding and decoding, with the compressed data bitstream divided into parcels (e.g., including parcels 332A-N). The number of bytes in each parcel is random or pseudorandom to accommodate the internal reliance or codability of each parcel. Just as with single threaded coding described above where division of the single thread can break codability, the parcels are not simply a fixed number of bits since certain divisions can make a segment of video data uncodable (e.g., if the divisions are not entry points as described above). With a random or pseudorandom number of encoded bits per parcel, the encoded bits are saved to separate memory buffers, and when encoding of an individually entropy codable parcel is finished, the data for the parcel can be copied contiguously to a single compressed-data byte array for storage or transmission. In some examples, different structures other than a single compressed-data byte array can be used as long as the integrity of individually entropy codable parcels and the relationships between the parcels as identified by the index 330 are maintained.

The parcel index 330 is used to describe the relationships between parcels, and to maintain the integrity of the compressed data, even as the data is segmented into parcels that can be coded independently in parallel. When the data is decoded from storage or received as part of a transmission, the information in index 330 is used to manage decoding of parcels using decoder units such as decoder units 340A, 340B, 340C, and 340N. As shown, encoder units send data to a particular decoder unit (e.g., encoder unit 310A sending parcel 332A to decoder unit 340A). However, in various examples, parcels from a single encoder unit can be decoded by any number of different decoder units (e.g., three parcels encoded by encoder unit 310B can be decoded in parallel by decoder units 340A, 340C, and 340N, for example).

Figure 4:
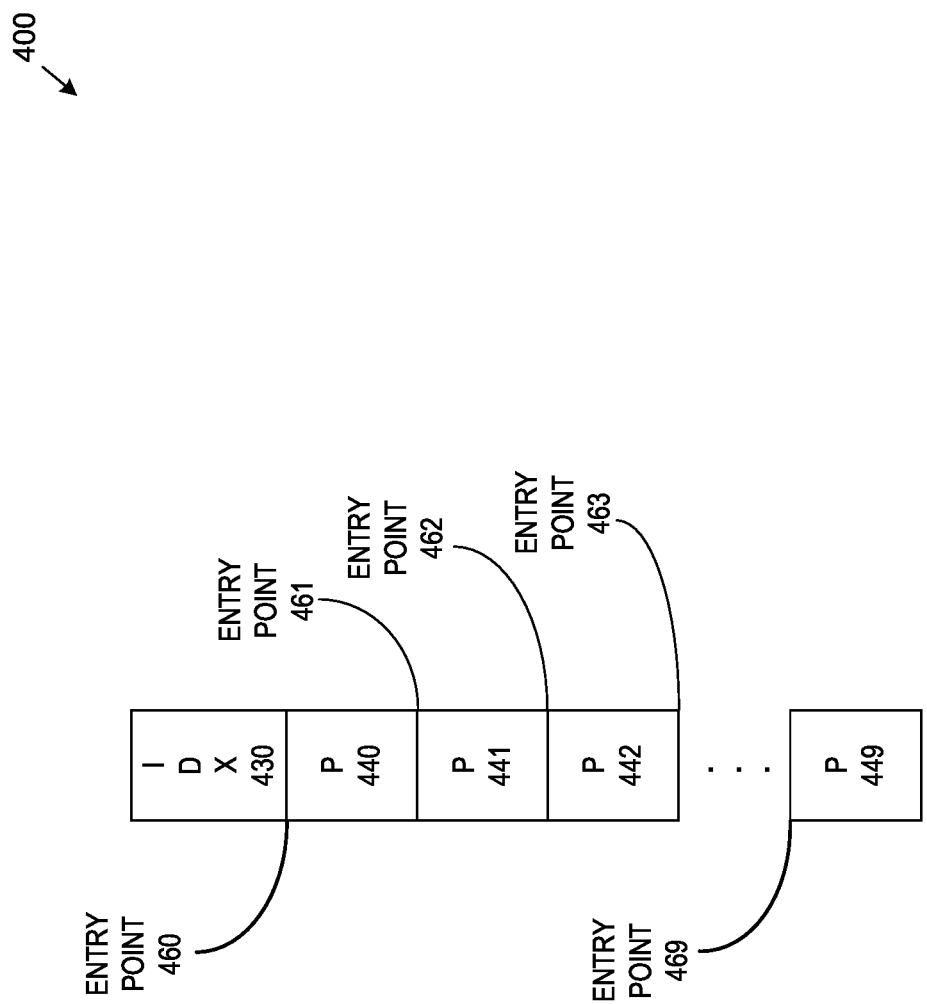
FIG. 4 is a diagram illustrating aspects of an index describing entry points separating independently entropy codable parcels for parallel entropy coding, in accordance with examples described herein.

FIG. 4 is a diagram illustrating aspects of an encoded bitstream 400 with index 430 describing entry points separating independently entropy codable parcels for parallel entropy coding in accordance with examples described herein. Encoded bitstream 400 of FIG. 4 may, for example, included parcels 332A-N of FIG. 3 arranged for storage or transmission as described above, or can be any such video data coded for parallel coding in accordance with examples described herein. Encoded bitstream 400 includes parcels 440, 441, 442, and 449. Other examples of an encoded bitstream created from a sequence of video data can have any number of parcels. Each parcel has an associated entry point. As illustrated, entry point 460 corresponds to parcel 440, entry point 461 corresponds to parcel 441, entry point 462 corresponds to parcel 442, and entry point 469 corresponds to parcel 449. Entry point 463 corresponds to the parcel following parcel 442, which is not shown. Each entry point is associated with a position in the encoded bitstream where a state for decoding is knowable by a decoder configured in accordance with the examples described herein, allowing the parcels to be independently decodable in parallel by decoder units. Index 430 is a data structure that, in some examples, contains the number of bytes in each parcel or equivalently, the array position of each entry point. The parcel index 430 data can then be used to identify the parcels from a stored or transmitted encoded bitstream 400, as well as to reassemble the sequence of video data used to generate the encoded bitstream 400.

Since the parcel index 430 is needed to decode the encoded bitstream 400, the index 430 is kept with the parcels of the encoded bitstream 400. Any decoding begins with decoding of the index 430 to identify information related to the independently decodable parcels. Additionally, to effectively identify the parcels, the number of bits used to encode parcel entry points are added to the total number of bits needed for encoding that parcel. Identification of parcels in index 430 thus uses entry points in the encoded bitstream to account for the encoding, or for the number of bits and position in the bitstream for each parcel to similarly accommodate any bits used for encoding. In some examples, for effective parallelization, a video bitstream may result in many parcels with a relatively small number of bytes. In such examples, the overhead of coding the index can degrade compression, in addition to the limited ability to use prediction with small parcel sizes. For example, to simplify hardware design and minimize costs, some examples can have parcel sizes limited to a range of 16-64 bytes. In other examples, other threshold limitations or ranges can be used. For parcels of that size overheads of a few bytes per parcel translate into significantly worse compression.

Examples described herein provide a technical solution to the technical problem of how to limit the added overhead by limiting the number of bits used to encode the whole parcel index. Assuming N parcels, the information to be coded is the sequence with the random number of bytes used by each parcel, represented by $$\mathcal{L}_L=(l_1,l_2,l_3,\ldots,l_N). \quad (1)$$

Since parcel data decoding relies on these numbers, the decoding is not able to start before the number are decoded, and use of a low-complexity method for coding the numbers provides improved device performance when decoding. In addition, examples described herein can use a single coding method that can be used for any type of statistical distribution and any range of magnitudes to allow a benefit of compatibility across many different systems.

Universal codeword sets are applicable to integers of any size. Among universal codword sets, the Elias gamma code, also known as an "exp-Golomb" code, is used in several video compression standards because it is simple to implement and allows acceptable device performance. The number of bits the Elias gamma code uses for coding a positive integer number n is $$B_\gamma=2\lfloor \log_2 n \rfloor+1 \quad (2)$$

The Elias delta code can code positive integer numbers with an asymptotically smaller number of bits, equal to $$B_\delta=\lfloor \log_2 n \rfloor + 2\lfloor \log_2(\lfloor \log_2 n \rfloor + 1)\rfloor + 1$$

However, in practice this code is not commonly used to code large number of integers because it uses two logarithm computations for each number.

Other coding methods, like Huffman coding, are more complicated to implement because they can only be applied to finite sets of integers, requiring special strategies for dealing with numbers outside the sets (e.g., extra coding definitions for dealing with overflows), and can only be optimized to pre-known probability distributions.

Examples described herein use operations described as nested bisection coding that can also be universally used. Such operations can improve the operations of a device when compared to general universal codeword set use described above, without depending on any assumption about the statistics of the numbers, or their magnitude range (e.g., it works equally well for small or very large numbers).

For example, one fundamental limitation of universal codeword sets is that they are meant to be used without any prior information about the integer number to be coded. Thus, some additional bits are needed to encode information about the magnitude of the number, followed by the bits of the number's binary representation, when general universal codeword structures are used. Examples described herein further improve device operation when compared to general universal codeword usage by exploiting the fact that video data parcels as described above are data sets with many non-negative integers. More specifically, examples described herein provide benefits based on the use of information about magnitude that is shared by all the numbers to be coded, and some similarity between magnitudes (e.g., extreme cases like $l_1=1$, $l_2=10^9$ are not expected to be common). To enforce conditions leading to the benefits from examples described herein threshold limitations can be applied by a coding system to parcels structured for parallel coding. For example, some implementations can include a threshold limit on the size difference between parcels (e.g., a minimum size of 32 bits and a maximum size of 128 bits, or a minimum size of 16 bits and a maximum size of 64 bits, etc.). Additional information use to provide a benefit in the examples described herein, include that the example coding operations are implicitly defined by a simple and efficient algorithm, instead of pre-defined sets of binary codewords, and the operations include an accumulation of information during the encoding process.

Together, the above properties enable operations to improve the function of coding devices with parallel coding having limited overhead. To be able to use all the above described properties, in one illustrative example the following monotonic sequence is defined:

$$p_k = \sum_{i=1}^{k} l_i, k = 0, 1, 2, \ldots, N, \quad (4)$$

with $$S = p_N = \sum_{i=1}^{N} l_i, \quad (5)$$

and define the sequence of byte positions where parcels start as $$\mathcal{P} = (p_0 = 0, p_1, p_2, \ldots, p_N = S). \quad (6)$$

Encoding the integers in sequence $\mathcal{P}$ is equivalent to encoding the numbers in sequence $\mathcal{L}$.

The integer numbers in sequence $\mathcal{P}$ can be coded sequentially, with a process to collect some information after each value is coded to improve coding of the next value. The information can be efficiently collected in a hierarchical manner. The example coding operations referred to above as nested bisection coding uses two nested applications of bisection.

In a first application of bisection, referred to as outer bisection enumeration, the order in which the elements of sequence $\mathcal{P}$ are encoded is determined, along with aggregation of coding information according to a tree data structure.

Figure 5A:
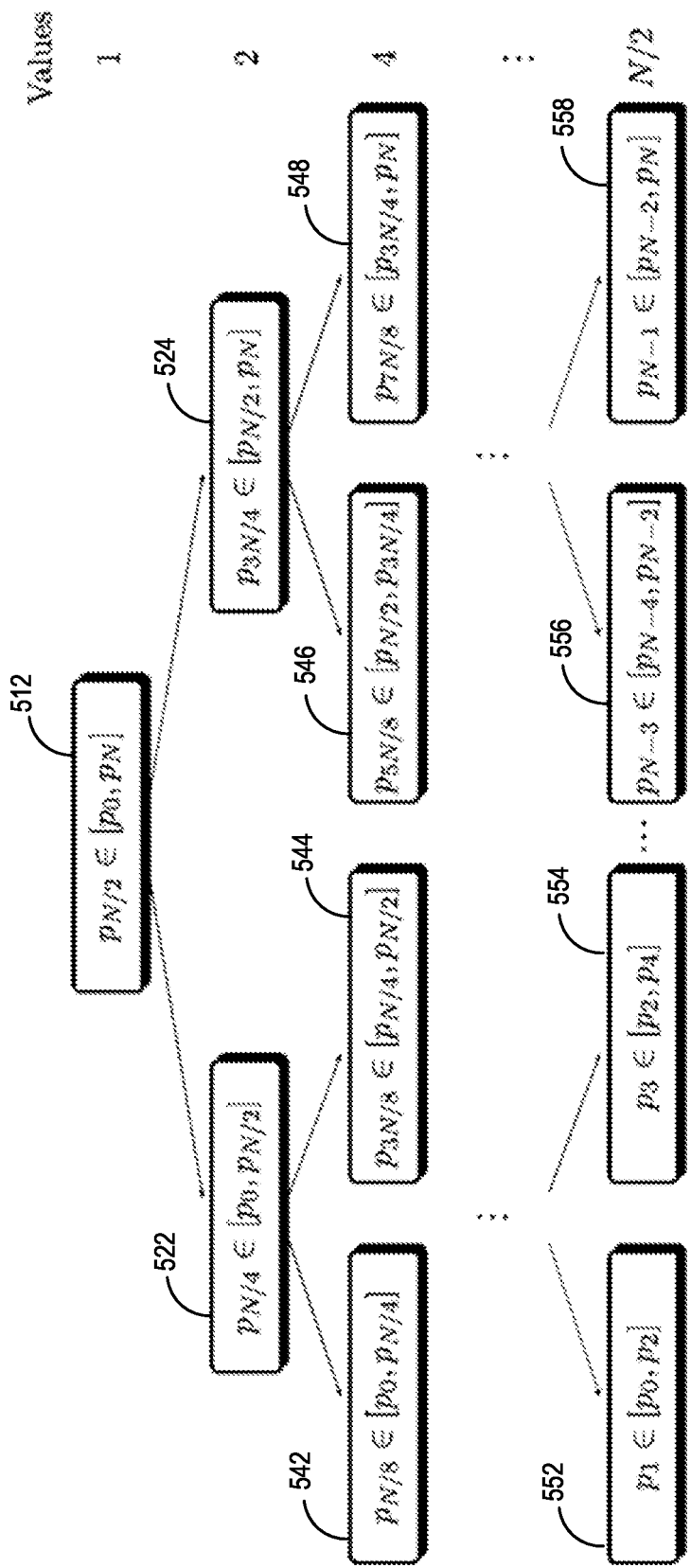
FIG. 5A illustrates tiers of a tree structure describing bisection operations for use with examples described herein.

FIG. 5A illustrates tiers of a tree structure describing bisection operations for use with examples described herein. FIG. 5A particularly illustrates aspects of the first application of bisection described above, outer bisection enumeration. The bisection searches, including outer bisection enumeration, are done in two types of integer sets. One integer set is open interval for indexes and one closed interval for positions, which can be represented as:

$$(i_{min}, i_{max}), [p_{min}, p_{max}] \quad (7)$$

where $$(i_{min}, i_{max}) = \{i_{min}+1, i_{min}+2, \ldots, i_{max}-2, i_{max}-1\}, \quad (8)$$

and $$[p_{min}, p_{max}] = \{p_{min}, p_{min}+1, \ldots, p_{max}-1, p_{max}\}. \quad (9)$$

The tree structure of FIG. 5A illustrates the accumulation of information during the bisection. Each box 512, 522, 524, 542, 544, 546, 548, 552, 554, 556, and 558 of FIG. 5A is associated with an entry point of a coded bitstream as associated with a position in the encoded bitstream. When each value in a box is coded following a pre-order tree traversal sequence, the value can use the previously coded values to reduce the uncertainty about the number range for a parcel that is defined between two values when all values are determined, and thus make coding more efficient. Boxes at the top tiers of the tree need more bits to be coded, but the overhead is relatively small because the number of boxes grows exponentially with tree depth. Values 510 illustrate the number of values at each tier, which starts at a single value for box 512 at a first tier, and doubles at every tier.

The operations of the outer bisection enumeration can also be considered as follows. Starting with a sequence of video data, the sequence is split into two subsequences by selecting a position in the sequence of video data (e.g., bisecting the sequence of video data). The selected position will be associated with an entry point in the encoded video bitstream. The first selected position is associated with the first box 512 at the first position in the tree structure of FIG. 5A. The two subsequences are then bisected to select the two values associated with box 522 and 524 of the second tier. The second tier bisections result in four subsequences, which can then be similarly bisected to identify the values for boxes 542, 544, 546, and 548. Just as above, each of the values is associated with what will become an entry point in the coded video bitstream. The process is repeated by bisecting tiers of subsequences of the sequence of video data to generate additional subsequences defined by additional entry points between the additional sequences and additional entry points between two parcels of the sequence of video data to generate individually codable parcels for the sequence of video data, where the individually codable parcels are identified by the entry points for the sequence of video data. At a final tier, every point identified when subsequences are bisected is associated with an entry point, and the data between the points is the data for the individually codable parcels. The bisection operation can use rules to identify appropriate points in the data for entry points. As described above, the bisection position ends up random or pseudorandom due to the segments not being split consistently, but based on characteristics of the data (e.g., along codable boundaries in the data). The pseudorandom characteristics can result, for example, in one sequence 1000 bits long being bisected into a 20-bit subsequence and a 980-bit sequence. If a minimum sequence length for a parcel is 16 bits, the 20-bit subsequence is not bisected further, and that branch of the tree stops at that tier, while the 980-bit sequence is bisected further. Each branch can terminate further bisection when an associated sequence either contains no suitable position for an entry point, or a further bisection would result in a sequence below an acceptable bit length. In other examples, other such criteria for ending the outer bisection enumeration can be used. Once the outer bisection enumeration is completely finished, data for all parcels is known along with the data boundaries between the parcels.

Each box of FIG. 5A can be considered as associated with a bisection operation and a position is associated with an entry point for the data encoded as a parallel entropy codable sequence of video data. Box 512 is associated with bisection of an initial sequence of video data, and a position associated with box 512 will become an entry point after additional data is added to the final subsequences of data (e.g., after selection of all boxes or bisection positions). The additional boxes below box 512 are associated with bisection of subsequences of data in additional tiers. As each position is selected and additional tiers of subsequences are bisected, the subsequences of data become smaller until the final subsequences of data are selected by the final bisection positions. The final complete set of positions (e.g., positions from every box in FIG. 5A), define the subsequences of data from the complete set of video data that will become individual parcels. Before the data for the final subsequences are individually codable, additional information (e.g., information about the number of bits in a final subsequence) is added to turn the final subsequence data from the video data into the individually entropy codable parcels.

The next operations then code the data and account for the coding overhead in identifying parcel information for the index (e.g., boundaries in the coded video bitstream including the coding overhead, or bit lengths of the coded parcels including all bits for the coded bitstream).

Using the above, the operations can proceed with the values from the outer bisection enumeration (e.g., the identified positions from the unencoded data to be associated with entry points and parcel boundaries), the data for each subsequence between values can be encoded as a parcel, along with any overhead data. In one example, a stack data structure is used with the values from the outer bisection enumeration (e.g., pre-order tree transferal) with the following operations described using the same notation as above.

The number of parcels N determined by the outer bisection enumeration, and the total number of bytes S is encoded using a universal codeword set (e.g., the Elias delta code, or any other such code set). A stack is initialized in memory by pushing sets:

$$(i_{min}, i_{max}) = (0, N), [p_{min}, p_{max}] = [0, S]; \quad (10)$$

As described above. The following operations are then used as long as the stack is not empty:
The stack is popped to retrieve current interval sets:

$$(i_{min}, i_{max}), [p_{min}, p_{max}]; \quad (11)$$

a new index is defined as:

$$i = \lfloor (i_{min} + i_{max})/2 \rfloor; \quad (12)$$

and bisection is used to encode:

$$p_i \in [p_{min}, p_{max}]. \quad (13)$$

If $(i_{min}, i) \neq \emptyset$ then sets $(i_{min}, i), [p_{min}, p_i]$ are pushed to the stack, and if $(i, i_{max}) \neq \emptyset$ then "sets $(i, i_{max}), [p_i, p_{max}]$ are pushed to the stack.

The operations following equation 10 above are then repeated until $(i_{min}, i) = \emptyset$ and $(i, i_{max}) = \emptyset$. At this point, the entire sequence of video data has been coded into individually decodable parcels that can be decoded in parallel as the encoded video bitstream, and all needed information is available for the index.

In one example in accordance with the above operations, bisection used to encode $p_i \in [p_{min}, p_{max}]$ is performed as follows: Given $p_i$ and $p_{min}, p_{max}$, initialize variables $a \leftarrow p_{min}$; $b \leftarrow p_{max}$; $c \leftarrow \lfloor (a+b)/2 \rfloor$. While $c \neq a$ repeat the following operations: If $c \leq p_i$ then encode bit "1" and set $a \leftarrow c$. When $c = a$, encode bit "0" and set $b \leftarrow c$. Update $c \rightarrow \lfloor (a+b)/2 \rfloor$.

The decoding algorithm is similar to the above encoding operations. For decoding, given $p_i$ and $p_{min}, p_{max}$, initialize variables $a \leftarrow p_{min}$; $b \leftarrow p_{max}$; $c \leftarrow \lfloor (a+b)/2 \rfloor$. While $c \neq a$ repeat the following operations. If the decoded bit is "1" then set $a \leftarrow c$, otherwise set $b \leftarrow c$. Update $c \leftarrow \lfloor (a+b)/2 \rfloor$, and return decoded value $p_i = a$.

The above examples illustrate aspects of coding operations in accordance with embodiments described herein, but it will be apparent that other examples and implementations are possible. The following further illustrate aspects of an example encoding implementation:

```
// "push" initial interval sets (i_min, i_max)=(0, N), [p_min, p_max]=[0, S]
stack.push(0, num_parcels, 0, byte_sum);
// encoding loop
while (!stack.empty( ) {
    // "pop" current sets
    stack.pop(idx_min, idx_max, pos_min, pos_max); // (i_min, i_max),[p_min, p_max]
    i=(idx_min+idx_max)>>1; // new index defined by outer enumeration
    a=pos_min; // inner bisection search and coding
    b=pos_max+1;
    c=(a+b)>>1;
    while (c !=a) {
        if (c<=position[i]) {// code bits defined by search results
            encode_bit(1);
            a=c;
        }
        else {
            encode_bit(0);
            b=c;
        }
        c=(a+b)>>1;
    }
    // "push" new subsets to stack
    if (i-idx_min>1)
        stack.push(idx_min, i, pos_min, position[i]);
    if (idx_max-i>1)
        stack.push(i, idx_max, position[i], pos_max);
}
```

Similarly, the following illustrates aspects of an example decoding implementation:

```
// "push" initial interval sets (i_min, i_max)=(0,N)[p_min, p_max]=[0,S]
stack.push(0, num_parcels, 0, byte_sum);
// decoding loop
while (!stack.empty( )){
    // "pop" current sets
    stack.pop(idx_min, idx_max, pos_min, pos_max);
    //(i_min, i_max),[p_min, p_max]
    i=(idx_min+idx_max)>>1; // new index defined by outer enumeration
    a=pos_min; // inner bisection search and coding
    b=pos_max+1;
    c=(a+b)>>1;
    while (c !=a) {
        if (decode_bit( )==1)// code bits define by search results
            a=c;
        else
            b=c;
        c=(a+b)>>1;
    }
    position[i]=a;
    // "push" new subsets to stack
    if (i-idx_min>1)
        stack.push(idx_min, i, pos_min, position[i]);
    if (idx_max-i>1)
        stack.push(i, idx_max, position[i], pos_max);
}
```

The above operations, or similar operations in accordance with examples described herein, can be used for data compression where parallelization of entropy coding is used to improve device performance for video processing with parallel encoding or decoding. The examples described herein allow parallel entropy coding with reduced processing resources and power consumption compared with similar devices, due to the structure of the overhead and parcel identification with bisection operations described above. The examples can enable low-cost parallel encoding and decoding in conjunction with neural-network based video processing codecs to improve processing of high resolution video data, high frame rate data, improved color resolution, and improved dynamic range video data. Because such improvements in video quality increase video data, the bottleneck of single threaded entropy coding described above can significantly impair performance compared with parallel coding. Parallel coding using operations described herein can be performed with low overhead and efficient processing circuitry with acceptable power consumption and improved data throughput associated with the parallelization.

The bisection-based coding examples described herein require approximately $\log_2(l_i)$ execution steps to code the index elements. For systems where the function $|\log_2(x)|$ can be computed efficiently (e.g., in one clock cycle of a device or processing system, or in a small number of clock cycles), it is possible to use a class of prefix codes. Prefix codes (or prefix-free codes), such as Huffman or Golomb codes, are commonly optimized for some probability distribution of the data symbols. As mentioned previously, however, some systems do not assume a knowledge of a probability distribution. When a number n to be encoded is such that $n \in \{0, 1, 2, \ldots, 2^B-1\}$, a device can efficiently encode that number with a fixed number of bits equal to B. In the general case, when $n \in \{0, 1, 2, \ldots, N_p-1\}$, the number n can be coded using $\lfloor \log_2(N_p) \rfloor$ bits for some values, and $\lfloor \log_2(N_p) \rfloor +1$ bits for the remaining values.

Some examples use the following method to specify how values are coded for a simple and efficient system in place of the bisection-based coding examples. Some such examples operate by sequentially increasing the number of bits used for coding values from $\lfloor \log_2(N_p) \rfloor$ bits to $\lfloor \log_2(N_p) \rfloor +1$, in the first and last values in the set of possible values. Table 1 below shows examples of prefix codes for integer values of $N_p$ from 4 to 8, with FIGS. 5B-5F showing tree representations of those codes.

TABLE 1

Binary Codewords

| n | $N_p = 24$ | $N_p = 5$ | $N_p = 6$ | $N_p = 7$ | $N_p = 8$ |
|---|---|---|---|---|---|
| 0 | 00 | 000 | 000 | 000 | 000 |
| 1 | 01 | 01 | 010 | 010 | 001 |
| 2 | 10 | 10 | 10 | 100 | 010 |
| 3 | 11 | 11 | 11 | 11 | 011 |
| 4 | — | 001 | 001 | 001 | 100 |
| 5 | — | — | 011 | 011 | 101 |
| 6 | — | — | — | 101 | 110 |
| 7 | — | — | — | — | 111 |

Figure 5B:
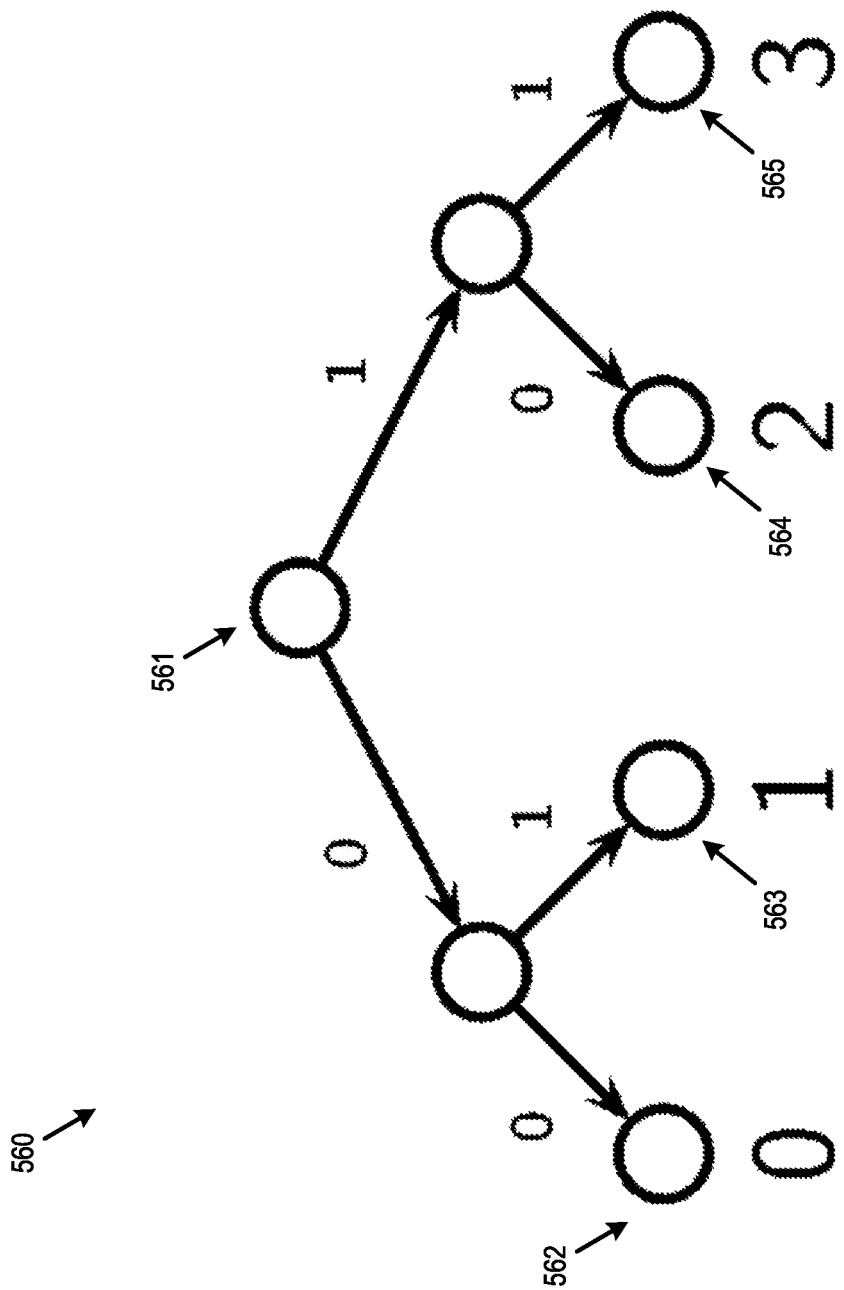
FIG. 5B illustrates aspects of prefix codes that can be used with examples described herein.

FIG. 5B illustrates aspects of prefix codes that can be used with examples described herein. FIG. 5B is a tree representation 560 of the code values for $N_p=4$. The path from starting position 561 to the n value positions 562-565 show how each code value is generated. For the n=0 code, the path from starting position 561 to the n=0 position 561 gives a code of 00. Similarly, the paths from starting position 561 to n=1 position 562, n=2 position 563, and n=3 position 565 are 01, 10, and 11, respectively.

Figure 5C:
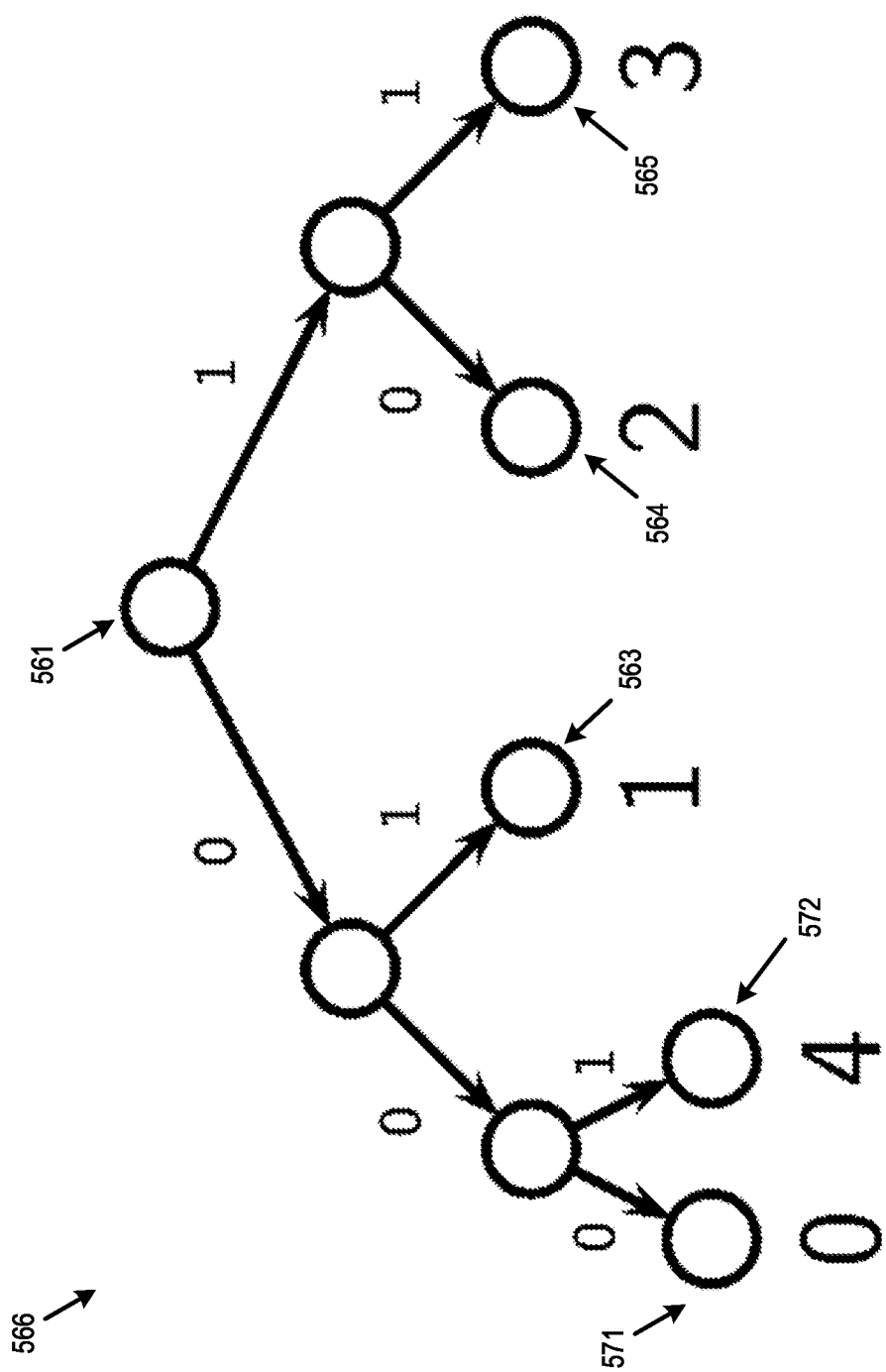
FIG. 5C illustrates aspects of prefix codes that can be used with examples described herein.

FIG. 5C illustrates aspects of prefix codes that can be used with examples described herein. FIG. 5C is a tree representation 568 of the code values for $N_p=5$. As shown by tree representation 570 and the paths from starting position 560 to positions 563, 564, and 565, the codes for values n=1, n=2, and n=3 are the same for $N_p=5$ as for $N_p=4$. The new n=4 position 572 not present for $N_p=4$ is 001, and n=0 position 571 has an additional bit for a value of 000.

Figure 5D:
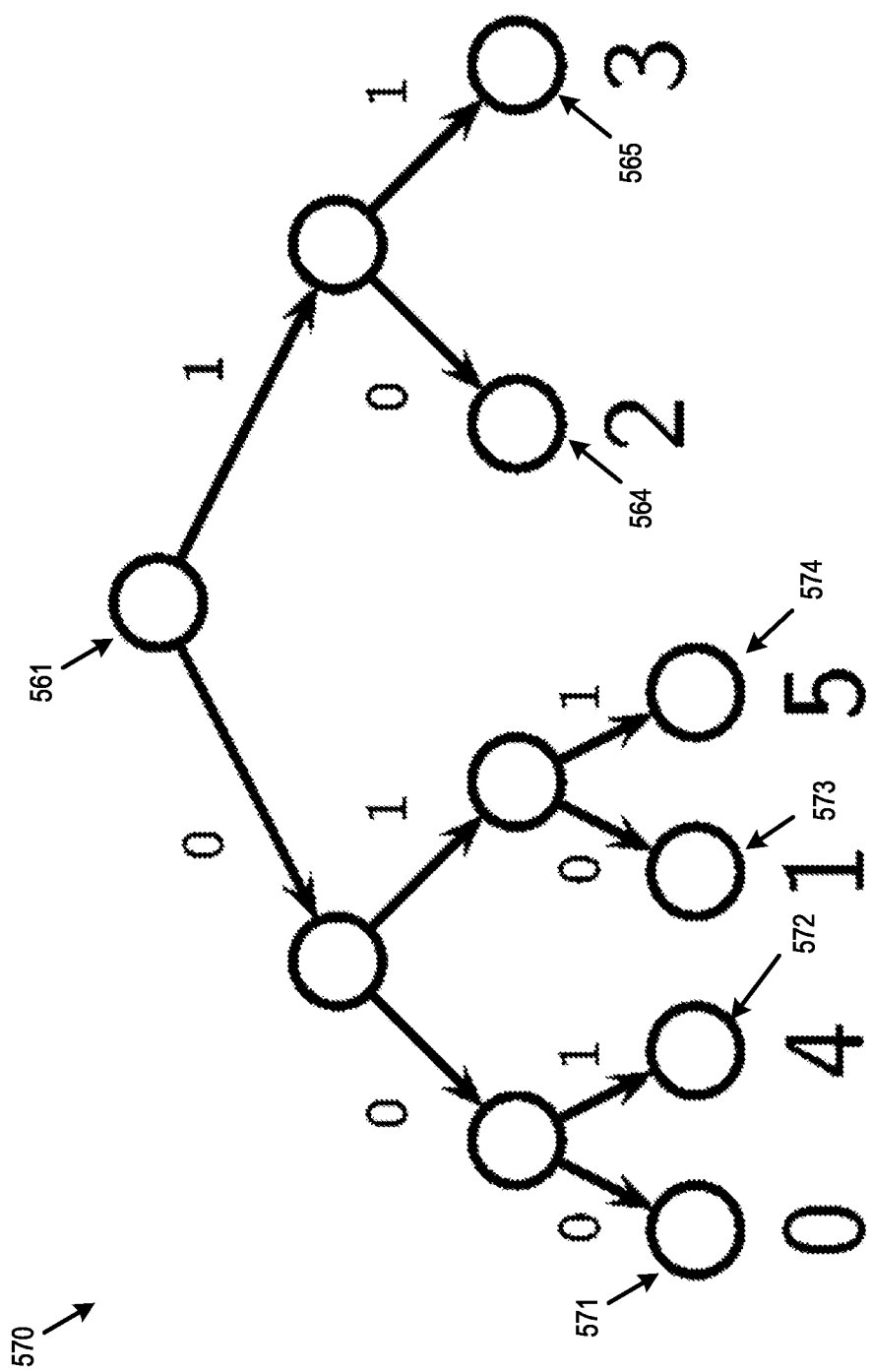
FIG. 5D illustrates aspects of prefix codes that can be used with examples described herein.
Figure 5E:
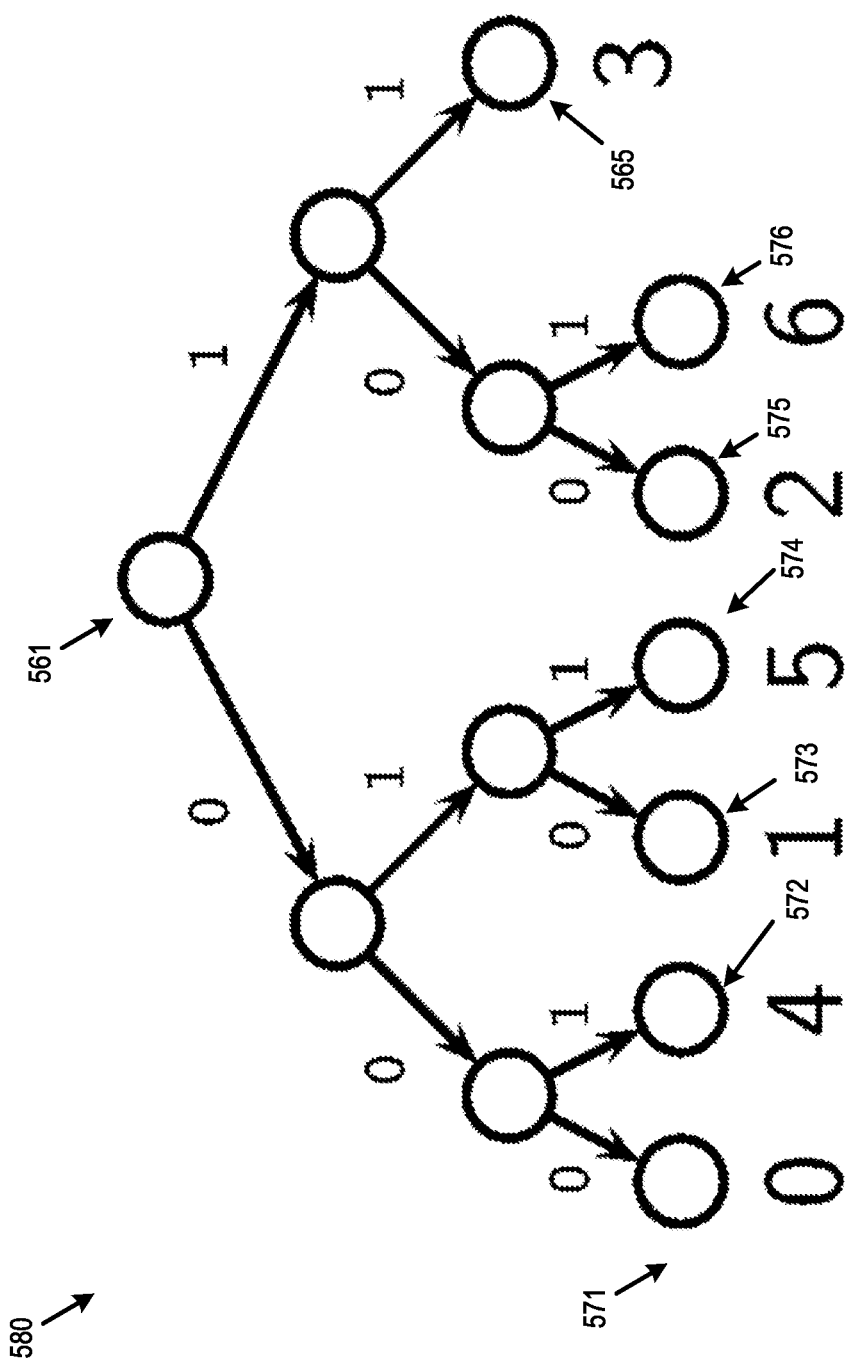
FIG. 5E illustrates aspects of prefix codes that can be used with examples described herein.
Figure 5F:
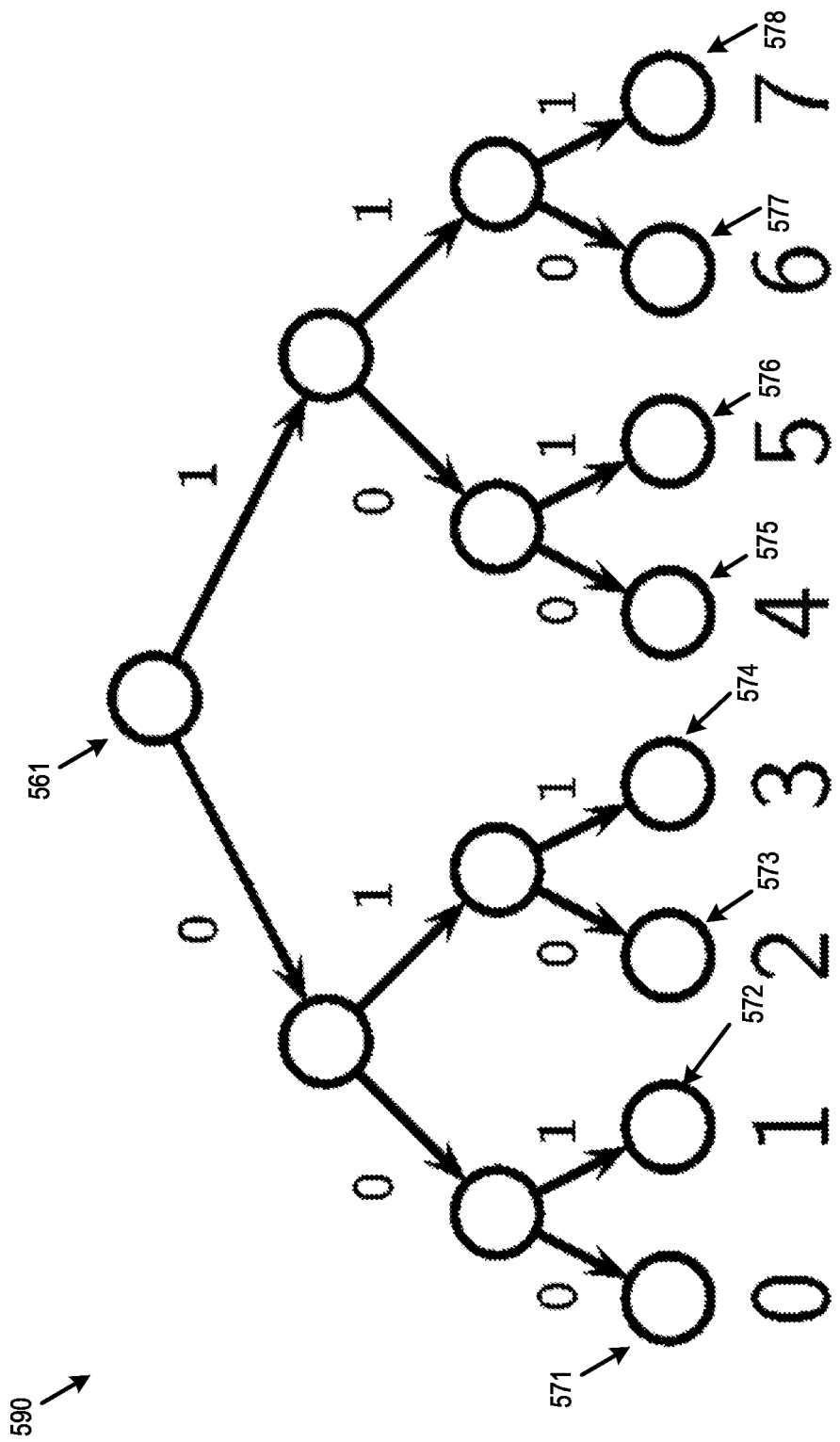
FIG. 5F illustrates aspects of prefix codes that can be used with examples described herein.

FIG. 5D illustrates aspects of prefix codes that can be used with examples described herein. FIG. 5E illustrates aspects of prefix codes that can be used with examples described herein. FIG. 5F illustrates aspects of prefix codes that can be used with examples described herein. Each of these figures show corresponding tree representations 570, 580, and 590 illustrating the code values for $N_p=6-8$. At each increasing $N_p$ value tree representation, the lowest value position in the lowest full branch tier is replaced with two values in the tier below. From $N_p=5$ to $N_p=6$, the position 563 is replaced by two positions 573 and 574 branching from that position. From $N_p=6$ to $N_p=7$, the position 564 is replaced by two positions 575 and 576 branching from that position. From $N_p=6$ to $N_p=7$, the position 565 is replaced by two positions 577 and 578 branching from that position. For each of the illustrated trees, the path branching from initial position 561 to the lowest tier position of each branch gives the code value for a corresponding n value.

The illustrated codes above are different from the well-known canonical Huffman codes, where the number of bits increases with coded value. Canonical Huffman codes are easier to encode and decode without generating a list of codewords and their number of bits. However, the codes illustrated allows a similarly simple set of prefix codes a shown by the following encoding and decoding algorithm descriptions.

An example encoding algorithm is:
1. Input: values of n and $N_p$ such that $n \in \{0, 1, 2, \ldots, N_p-1\}$;
2. Compute $B = \lfloor \log_2(N_p) \rfloor$ and $M = 2^B$;
3. Encode k=n mod M using B bits;
4. If $k+M < N_p$ then:
   a. Encode $\lfloor k/M \rfloor$ with one bit.

An example corresponding decoding algorithm is:
1. Input: value of $N_p$;
2. Compute $B = \lfloor \log_2(N_p) \rfloor$ and $M = 2^B$;
3. Decode k using B bits, and set n=k;
4. If $k+M < N_p$ then:
   a. Decode one bit, and if its value is 1 then set n=k+M;
5. Return value n.

Some examples described herein can then use the above described coding and decoding index elements in place of the bisection-based coding described in other portions of this description.

Figure 6:
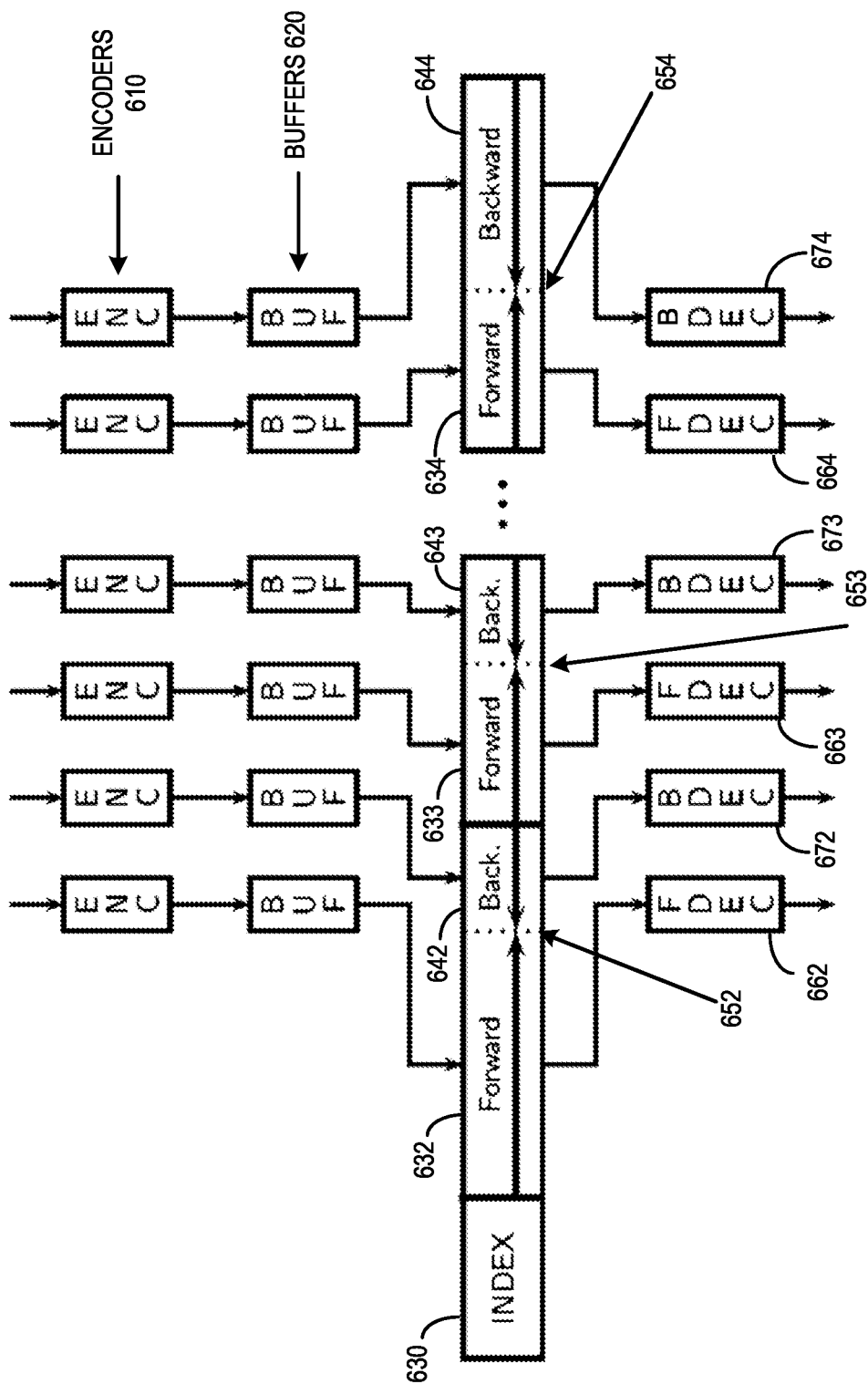
FIG. 6 is a diagram illustrating aspects of parallel coding for independently entropy codable parcels, in accordance with examples described herein.

FIG. 6 is a diagram illustrating aspects of parallel coding for independently entropy codable parcels in accordance with examples described herein. FIG. 6 illustrates a diagram similar to the diagram of FIG. 3, with additional improvements to reduce coding overhead for parallelization of entropy coding. As described above, an index identifies parcels and entry points, either using a number of bits and a position for each parcel, or using entry points (e.g., each of which can be used to identify the other data, with entry points identifiable from parcel bits and positions, and parcel bits and positions identifiable from entry points). Because adjacent parcels share a common boundary, a single entry point can be used to define the position of two parcels. In such an example, parcels can be defined either as forward parcels or backwards parcels. Encoder units 610 and buffers 620 can operate just as the encoder units and buffers of FIG. 3, but rather than an entry point identified at a start or end of each parcel as described in FIG. 4, pairs of parcels can be identified in association with the shared boundary between the parcels, and the entry points in index 630 can be halved.

For example, as shown, FIG. 6 includes forward parcels 632, 633, and 634, and backwards parcels 642, 643, and 644. The parcels form pairs joined at entry points 652, 653, and 654, such that a first pair of parcels 632 and 642 are joined by entry point 652, a second pair of parcels 633 and 643 are joined by entry point 653, and a third pair of parcels 634 and 644 are joined by entry point 654. Defining forward and backward parcels as pairs with a shared entry point as shown allows bidirectional byte packing for parallel entropy coding, with half the number of entry points in index 630 compared with index 430 without bidirectional byte packing. The forward parcels are then decoded by forward decoder units 662, 663, and 664, and backward parcels are decoded by backward decoder units 672, 673, and 674. The decoders can operate with the implementations described above, but with forward decoders incrementing the byte counter from during decoding, and backwards decoders decrementing the byte counter to decode the corresponding parcels. Just as above, parcel pairs remain independently decodable, and do not need to be decoded by specific pairs of decoder units. In some examples, decoders can be configured to decode either forward or backwards parcels, while in other units, decoders are customized to efficiently decode either forward or backwards parcels, but not both, as illustrated by FIG. 6. Such examples further improve the operations of a coding system and devices in the coding system by reducing overhead, improving throughput, and reducing power consumption (e.g., as associated with the reduced overhead).

Figure 7:
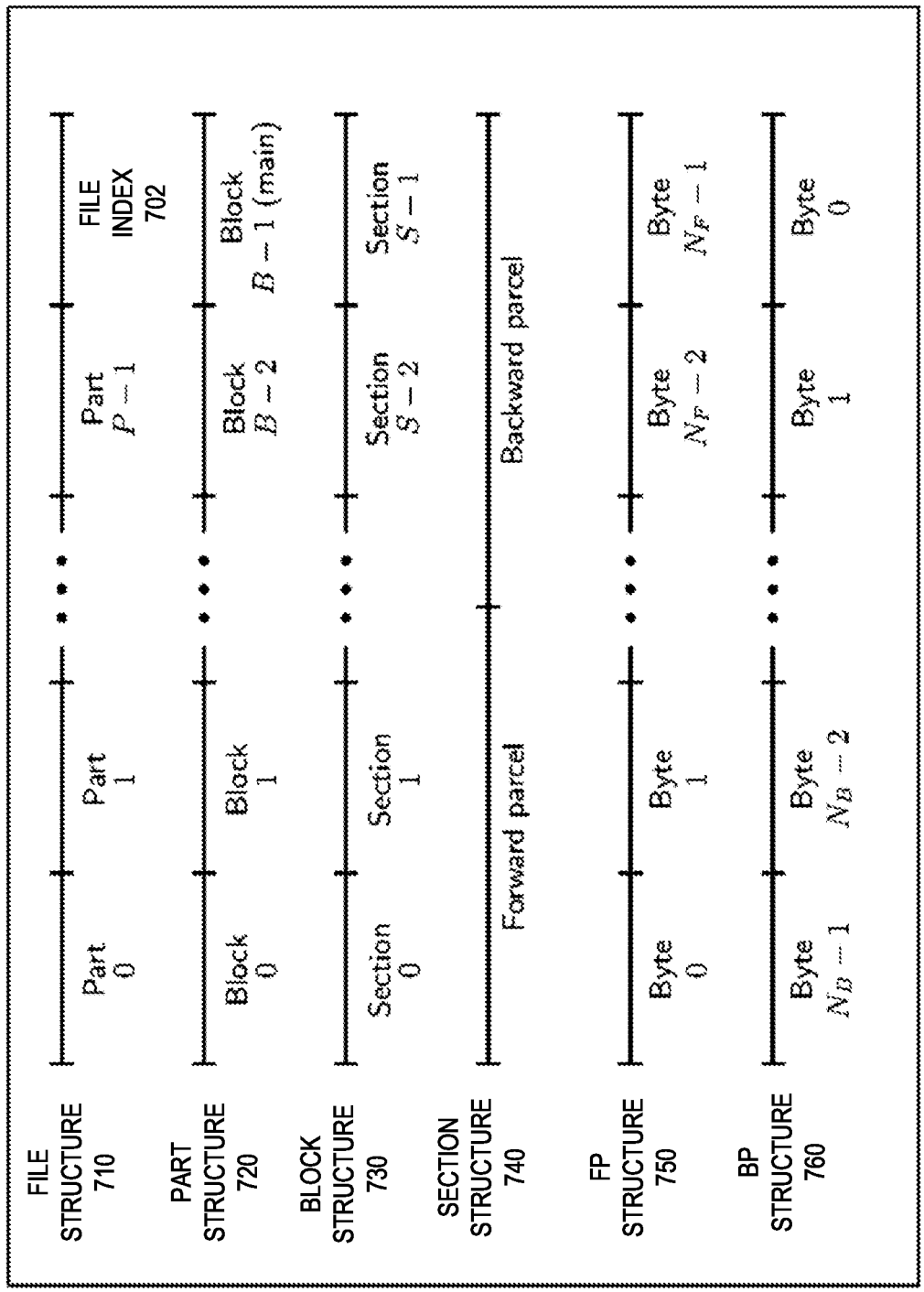
FIG. 7 illustrates a file structure for use with parallel coding of independently entropy codable parcels of a sequence of video data, in accordance with examples described herein.

FIG. 7 illustrates a file structure 710 for use with parallel coding of independently entropy codable parcels of a sequence of video data in accordance with examples described herein. The file structure 710 includes P parts along with a file index 702, similar to index 630 as described above. The parts of file structure 720 in the example of FIG. 7 include B blocks, and the blocks of block structure 730 each contain S sections. The example structure for parallel entropy coding provides a unified hierarchical organization that can be used with the parcels described above, and with minimal overhead. The structure can allow user control of file open and close operations, and start and stop operations at any part element of file structure 710 (e.g., part 0, part 1, part P-1, etc.). In some implementations, for example, the part elements can be used for video frames, and blocks of part structure 720 (e.g., block 0, block 1, block B-2, etc., of any part element using part structure 720 in file structure 710) can be associated with video codec function calls. A main block can include scalars for a part, with individual non-main blocks containing vector data. In some implementations, sector and parcel usage can be automated using neural network coding in conjunction with the above described parallel entropy coding operations.

The section structure 740 includes structure for a parcel pair including a forward parcel and a backwards parcel as described above. In some situations, an odd number of parcels may be present, such that a section may contain only a forward or a backwards parcel, but the pair structure of the sections allows byte packing as described above with respect to FIG. 6. Each forward parcel can then have Nf bytes as defined by forward parcel structure 750, and each backwards parcel can have Nb bytes as defined by backwards parcel structure 760. As described above, thresholds can be placed on the number of bytes, and in some examples, the thresholds can be the same or different for forward parcels and backwards parcels. In either case, the threshold can include both an upper and a lower limit on the number of bytes allowable for a given parcel to allow orderly bisection of video data, and to simplify coding and improve the operation of coding devices by limiting the variation in parcel sizes to be coded.

Figure 8A:
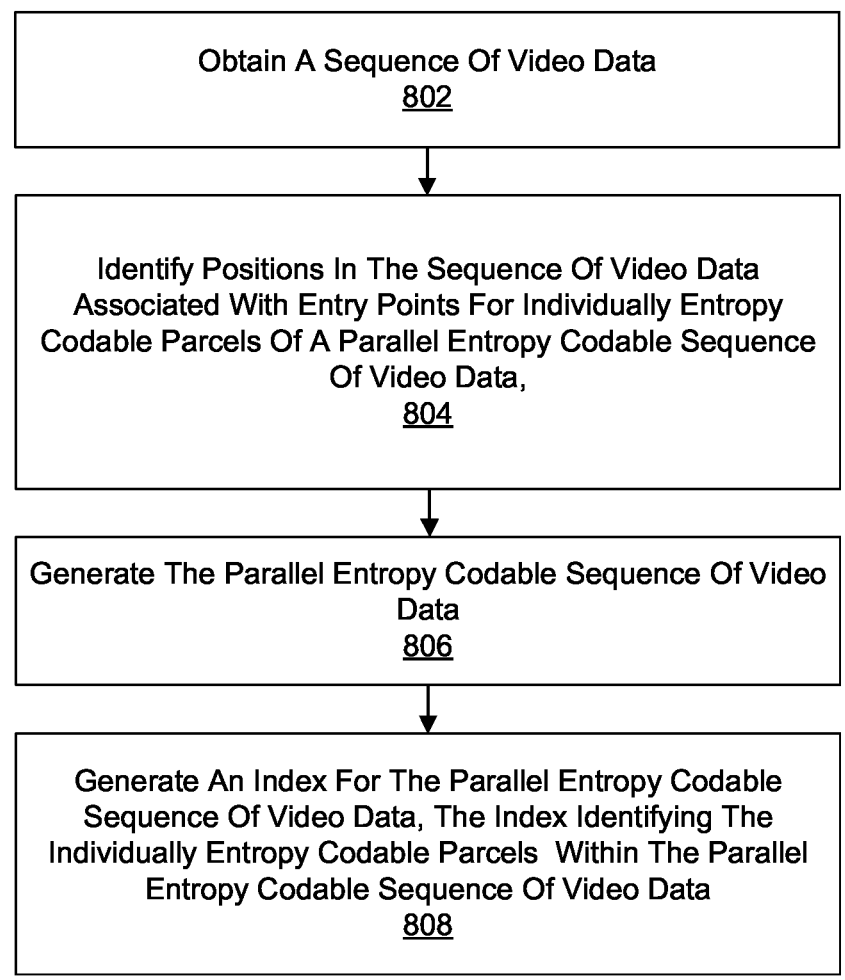
FIG. 8A illustrates a method of encoding video data, in accordance with examples described herein.

FIG. 8A is a flowchart illustrating an example of a process 800 of encoding video using operations for parallel entropy coding in accordance with examples described herein. In some examples, process 800 is performed by an apparatus comprising a memory and one or more processors, such as SOC 900 or a device according to architecture 1300. In other examples, process 800 is implemented as computer readable instructions in a storage medium, that when executing by processing circuitry causes coding operations to be performed. In some examples, a device performs process 800 using an encoding device such as encoding device 104. In some examples, aspects of entropy encoding can be performed with a neural network for complex wide scale parallelization with coding systems as described further below.

At block 802, the process 800 includes operations to obtain a sequence of video data. As described above, the sequence of video data can be any video data to be encoded for storage or transmission using parallel entropy encoding as described herein. Such parallel coding can particularly provide benefits when single threaded coding creates bottlenecks such as ultra-high resolution video (e.g. 8k video or higher resolutions), high frame rate video (e.g. 60 frames per second, 120 frames per second, or higher), increased data in the form of wider color resolution or gamut, high dynamic ranges, or high quality streaming of data. Parallel coding of a sequence of video data can also be used for artificial intelligence analysis or machine learning, where a machine analyzes video data in a way not constrained by a standard time display (e.g., where a computer can "watch" and/or process a two-hour movie in 1 second, as compared with a human displaying video frames and viewing them over two hours). Such parallel entropy coding can allow a machine learning or artificial intelligence system to decode and process video data at much higher rates than a single threaded coding system.

At block 804, the process 800 includes operations to identify positions in the sequence of video data associated with entry points for individually entropy codable parcels of a parallel entropy codable sequence of video data. In some examples, the entry points are identified at least in part by performing a bisection enumeration of the sequence of video data. In some examples, performing the bisection enumeration incudes bisecting the sequence of video data to identify an initial position of the positions. The initial position is associated with a first entry point and subsequences divided by the initial position. Performing the bisection enumeration can further include bisecting tiers of subsequences to identify a remaining portion of the positions. Other examples can use prefix codes, such as the prefix codes described above with respect to FIGS. 5B-5F to In some aspects, operations associated with block 804 can include determining coding information including information associated with the entry points for the individually entropy codable parcels. Some examples can include performing an outer bisection enumeration of the sequence of video data to determine the coding information. Details of an example of such an outer bisection enumeration are described above with respect to FIG. 5A. In some examples, block 804 can include operations to bisect the sequence of video data to identify a first entry point of the entry points, the first entry point defining two subsequences of the sequence of video data and a first boundary between two parcels of the individually entropy codable parcels. Block 804 can also include repeatedly bisecting tiers of subsequences of the sequence of video data to generate additional subsequences defined by additional entry points between the additional sequences and the additional entry points between adjacent parcels of the sequence of video data to generate individually codable parcels for the sequence of video data, wherein the individually codable parcels are identified by the entry points for the sequence of video data. As described above, in some examples, the outer bisection enumeration limits a difference between a largest parcel and a smallest parcel of the individually entropy codable parcels to less than a threshold difference.

In other examples of block 804, operations can select a number of parcels N by repeated bisection of the sequence of video data having a value of P bits to define a set of individually entropy codable parcels according to: $(i_{min}, i_{max}) = \{i_{min}+1, i_{min}+2, \ldots, i_{max}-2, i_{max}-1\}$, with the sizes $[p_{min}, p_{max}] = \{p_{min}, p_{min}+1, \ldots, p_{max}-1, p_{max}\}$ which sum to the value of P bits. In such an example, each i is an individually entropy codable parcel, $i_{min}$ is a first individually entropy codable parcel in the set of individually entropy codable parcels, and $i_{max}$ is a last individually entropy codable parcel in the set of individually entropy codable parcels. Similarly, in such an example, each p is the size in bits of a corresponding individually entropy codable parcel of the individually entropy codable parcels, $p_{min}$ is a size in bits of the first individually entropy codable parcel, and $p_{max}$ is a size in bits of the last individually entropy codable parcel.

At block 806, the process 800 includes operations to generate the parallel entropy codable sequence of video data. In some examples, such operations are implemented at least in part by performing a bisection search that encodes information associated with the individually entropy codable parcels with data from the sequence of video data determined by the positions to generate the individually entropy codable parcels. In some aspects, operations associated with block 804 can include performing an inner bisection search that encodes information of the sequence of video data in parallel as the individually entropy codable parcels while determining sizes of the individually entropy codable parcels.

In one example of block 806, operations are included to encode the number of parcels N, and a total number of bytes S using a universal codeword set, where $(i_{min}, i_{max}) = (0, N)$, $[p_{min}, p_{max}] = [0, S]$. The operations can further initialize a stack in the memory by pushing sets $(i_{min}, i_{max}) = (0, N), [p_{min}, p_{max}] = [0, S]$ to the stack, and encode a stream of video data.

In some examples, encoding the stream in block 806 includes operations to analyze the stack to retrieve current interval sets $(i_{min}, i_{max}), [p_{min}, p_{max}]$; define a new index $i = \lfloor (i_{min}, i_{max})/2 \rfloor$; use bisection to encode $p_i \in [p_{min}, p_{max}]$; update the stack with sets $(i_{min}, i)[p_{min}, p_i]$ when $(i_{min}, i) \neq \emptyset$; and update the stack with sets $(i, i_{max}), [p_i, p_{max}]$ when If $(i, i_{max}) \neq \emptyset$. The operations are repeated until the stack is empty (e.g., the entire stream or available portion of the stream is decoded).

In some such examples of block 806, the universal codeword set is an Elias delta code. Further, in some examples of block 806, operations to use bisection to encode $p_i \in [p_{min}, p_{max}]$ include operations to: initialize variables $a \leftarrow p_{min}$; $b \leftarrow p_{max}$; $c \leftarrow \lfloor (a+b)/2 \rfloor$. Then, when $c \neq a$, the following operations are repeated: encode bit "1" when $c \leq p_i$ and set $a \leftarrow c$; encode bit "0" when $c > p_i$ and set $b \leftarrow c$; and update $c \leftarrow \lfloor (a+b)/2 \rfloor$. The repeated operations above are finished and the encoding complete when $c = a$.

At block 808, the process 800 includes operations to generate an index for the parallel entropy codable sequence of video data. The index identifies the individually entropy codable parcels within the parallel entropy codable sequence of video data using the information associated with the entry points. As described above, the index can be structured in different ways, either using position and parcel length data, entry point data, or any combination of such data to define the structure of the encoded bitstream to be used for parallel decoding.

In some examples of block 808, such as described above with respect to FIG. 8, the index can be structured as pairs of parcels with a single entry point for the pair of parcels, and a parcel size for each parcel. In such an example, every other entry point is defined in the index, and the unincluded entry points (which are not in the index) can be derived from the included entry points and the parcel sizes. In one such example, block 808 can include operations to define parcels of the individually entropy codable parcels as forward parcels or backwards parcels, with a corresponding parcel pair that includes a corresponding forward parcel and a corresponding backwards parcel defined by a single shared entry point in the index. Some such examples will operate where the index includes N/2 entry points when a number of the individually entropy codable parcels is even, and the index includes $[(N-1)/2]+1$ entry points when the number of the individually entropy codable parcels is odd.

Some examples of process 800 can then store the individually entropy codable parcels in the memory structured as a file having a file structure including the index and a plurality of parts, each part including a plurality of blocks, each block including a plurality of sections, and each section including a forward parcel structure and a backward parcel structure for the corresponding forward parcel and the corresponding backwards parcel of the corresponding parcel pair.

Other examples of process 800 can then either save encoded data in memory, or transmit the encoded data. Some examples operate where process 800 includes operations to transmit the file including the index and the individually entropy codable parcels.

Additionally, in some examples of process 800, sizes of the individually entropy codable parcels are integer values for bits of the individually entropy codable parcels. In some examples of process 800, the index identifies the individually entropy codable parcels using the entry points as identified following encoding of the sequence of video data in an encoded bitstream. In some examples of process 800, the index identifies the individually entropy codable parcels by identifying a bit length and a position of each parcel in an encoded video bitstream generated from the sequence of video data.

Figure 8B:
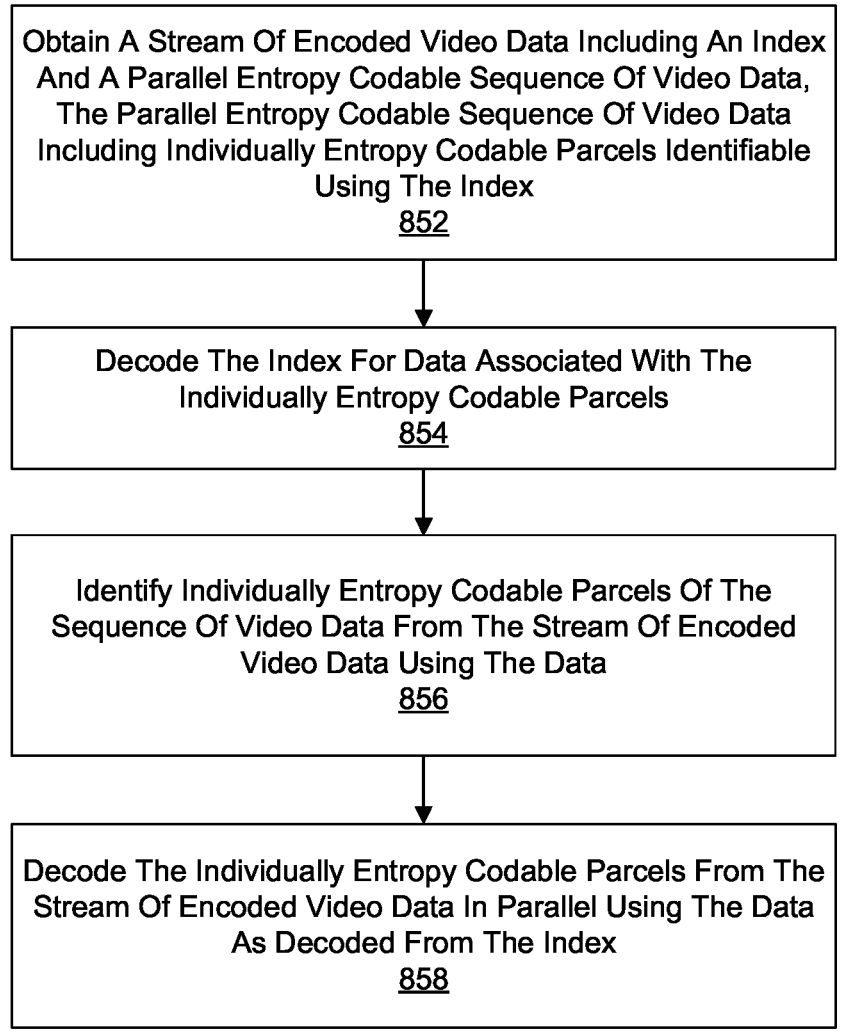
FIG. 8B illustrates a method of encoding video data, in accordance with examples described herein.

FIG. 8B is a flowchart illustrating an example of a process 850 of decoding video using operations for parallel entropy coding in accordance with examples described herein. Process 850 can be considered a corresponding decoding process for the encoding process 800 of FIG. 8A. Just as above for process 800, in some examples, process 850 is performed by an apparatus comprising a memory and one or more processors, such as SOC 900 or a device according to architecture 1300. In other examples, process 850 is implemented as computer readable instructions in a storage medium, that when executing by processing circuitry causes coding operations to be performed. In some examples, a device performs process 850 using a decoding device such as decoding device 112. In some examples, aspects of entropy encoding can be performed with a neural network for complex wide scale parallelization with coding systems as described further below.

At block 852, the process 850 includes operations to obtain a stream of encoded video data including an index. The encoded video data can be data encoded using the method 800 described above including the sequence of video data from block 806 and the video data from block 808. As described above, the sequence of video data can be any video data to be encoded for storage or transmission using parallel entropy encoding as described herein. Such parallel coding can particularly provide benefits when single threaded coding creates bottlenecks such as ultra-high resolution video (e.g. 8k video or higher resolutions), high frame rate video (e.g. 60 frames per second, 120 frames per second, or higher), increased data in the form of wider color resolution or gamut, high dynamic ranges, or high quality streaming of data. Parallel coding of a sequence of video data can also be used for artificial intelligence analysis or machine learning, where a machine analyzes video data in a way not constrained by a standard time display (e.g., where a computer can "watch" and/or process a two-hour movie in 1 second, as compared with a human displaying video frames and viewing them over two hours). Such parallel entropy coding can allow a machine learning or artificial intelligence system to decode and process video data at much higher rates than a single threaded coding system.

At block 854, the process 850 includes operations to decode sizes of the individually entropy codable parcels from the index.

At block 856, the process 850 includes operations to identify individually entropy codable parcels of the sequence of video data from the stream of encoded video data using the entry points of the index. Operations of block 854 can be considered the inverse of operations 804, where the positions identified in block 804 during encoding are then identified using parcel sizes identified in block 854 to identify the individually entropy codable parcels in block 856. These operations use the index values from operation 808 to allow identification of the relevant information to allow decoding of the parallel entropy codable sequence of video data.

At block 858, the process 800 includes operations to decode the individually entropy codable parcels from the stream of encoded video data in parallel using the decoded sizes of the individually entropy codable parcels (e.g., using bit size data for parcels and/or entry point data at the boundaries of a parcel). As described herein, block 858 can include parallel operations to allow parcels in parallel decoding systems to independently decode parcels from different positions within a sequence of video data. Following decoding of all the parcels of a sequence of video data, the parcels can then be integrated to generate a complete sequence of video data that can be stored or output to a display.

In addition to the bisection enumeration and bisection search operations described above in methods 800 and 850, other implementations can use the prefix codes described in FIGS. 5B-5F as an alternative to the bisection enumeration and bisection search operations described above. In either case, the index values are used in encoding and decoding the individually entropy codable parcels as described herein.

Figure 13:
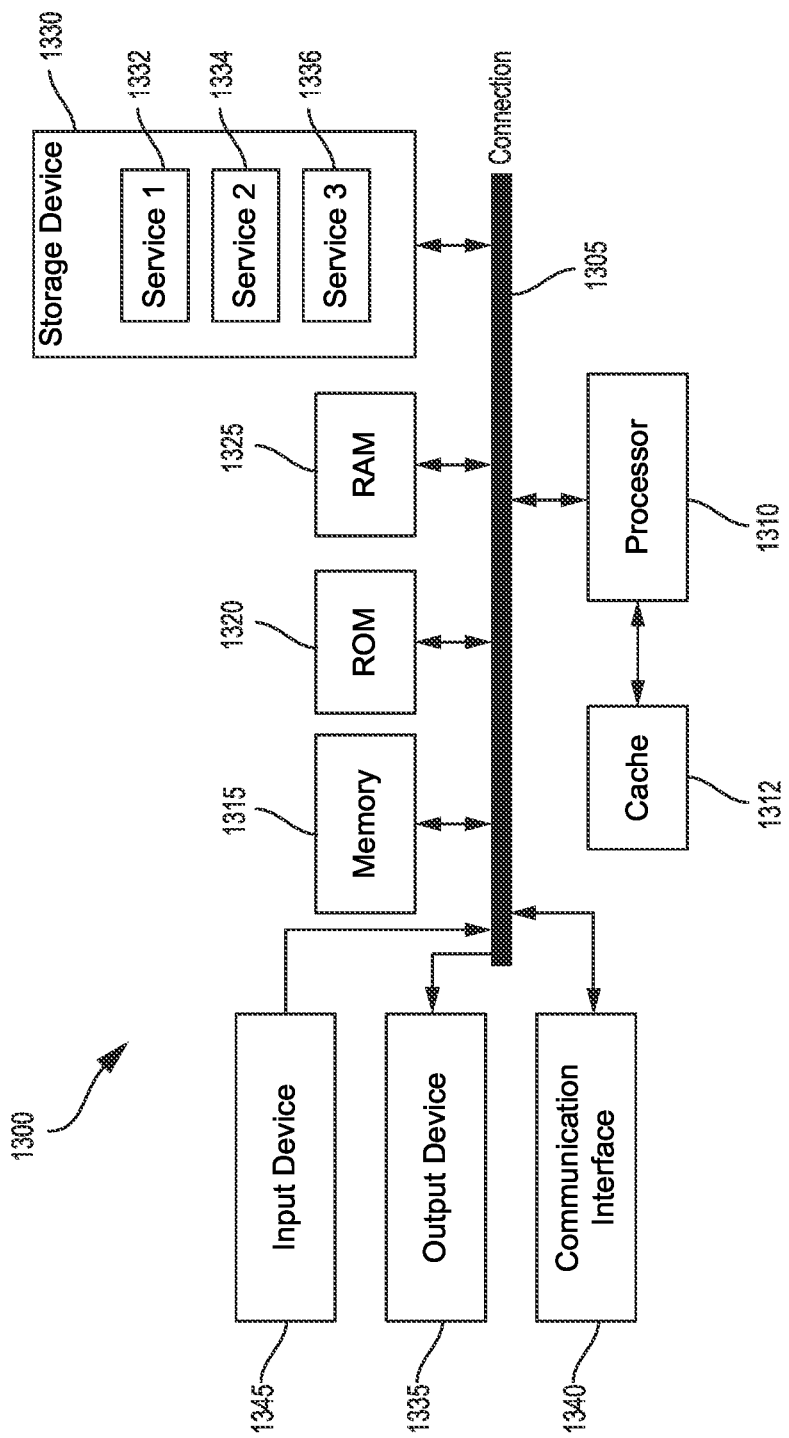
FIG. 13 illustrates an example computing device architecture of an example computing device which can implement the various techniques described herein.

In some examples, the processes described herein (e.g., process 800, and/or other process described herein) may be performed by a computing device or apparatus, such as a computing device having the computing device architecture 1300 shown in FIG. 13. In one example, the process 800 can be performed by a computing device with the computing device architecture 1300 implementing any architecture described herein. In some examples, the computing device can include a mobile device (e.g., a mobile phone, a tablet computing device, etc.), a wearable device, an extended reality device (e.g., a virtual reality (VR) device, an augmented reality (AR) device, or a mixed reality (MR) device), a personal computer, a laptop computer, a video server, a television, a vehicle (or a computing device of a vehicle), robotic device, and/or any other computing device with the resource capabilities to perform the processes described herein, including process 800.

In some examples, the systems and techniques described herein can be used to perform image and/or video coding using one or more machine learning (ML) systems. As mentioned above, parallel coding of a sequence of video data can also be used for artificial intelligence analysis or machine learning, where a machine analyzes video data in a way not constrained by a standard time display. Parallel decoding of a file, (e.g., a file using file structure 710 above), can be performed by a machine learning system to analyze a video file at the highest possible speed. In some examples, where a machine learning system is configured to "watch" and/or process an ultra-high definition movie as fast as the video data can be decoded, parallel entropy coding can drastically improve machine processing times. Such parallel entropy coding can allow a machine learning or artificial intelligence system to decode and process video data at much higher rates than a single threaded coding system.

In general, ML is a subset of artificial intelligence (AI). ML systems can include algorithms and statistical models that computer systems can use to perform various tasks by relying on patterns and inference, without the use of explicit instructions. One example of a ML system is a neural network (also referred to as an artificial neural network), which may include an interconnected group of artificial neurons (e.g., neuron models). Neural networks may be used for various applications and/or devices, such as image and/or video coding, image analysis and/or computer vision applications, Internet Protocol (IP) cameras, Internet of Things (IoT) devices, autonomous vehicles, service robots, among others.

Individual nodes in the neural network may emulate biological neurons by taking input data and performing simple operations on the data. The results of the simple operations performed on the input data are selectively passed on to other neurons. Weight values are associated with each vector and node in the network, and the values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as an activation map or feature map). The weight values may initially be determined by an iterative flow of training data through the network (e.g., weight values are established during a training phase in which the network learns how to identify particular classes by their typical input data characteristics).

Different types of neural networks exist, such as convolutional neural networks (CNNs), recurrent neural networks (RNNs), generative adversarial networks (GANs), multilayer perceptron (MLP) neural networks, among others. For instance, convolutional neural networks (CNNs) are a type of feed-forward artificial neural network. Convolutional neural networks may include collections of artificial neurons that each have a receptive field (e.g., a spatially localized region of an input space) and that collectively tile an input space. RNNs work on the principle of saving the output of a layer and feeding this output back to the input to help in predicting an outcome of the layer. A GAN is a form of generative neural network that can learn patterns in input data so that the neural network model can generate new synthetic outputs that reasonably could have been from the original dataset. A GAN can include two neural networks that operate together, including a generative neural network that generates a synthesized output and a discriminative neural network that evaluates the output for authenticity. In MLP neural networks, data may be fed into an input layer, and one or more hidden layers provide levels of abstraction to the data. Predictions may then be made on an output layer based on the abstracted data.

In layered neural network architectures (referred to as deep neural networks when multiple hidden layers are present), the output of a first layer of artificial neurons becomes an input to a second layer of artificial neurons, the output of a second layer of artificial neurons becomes an input to a third layer of artificial neurons, and so on. CNNs, for example, may be trained to recognize a hierarchy of features. Computation in CNN architectures may be distributed over a population of processing nodes, which may be configured in one or more computational chains. Such multi-layered architectures may be trained one layer at a time and may be fine-tuned using back propagation.

Conventional compression methods have been designed for sequential coding and computations, and thus are structure with only a few independent data blocks. Neural-network based compression can, enable wide-scale parallel computations and coding, which utilize a large number of independent data blocks (e.g., data parcels). Examples described herein enable efficient indexing of large numbers of data parcels. Without such indexing, the parcel index overhead (e.g., the amount of extra data to encode an index to the large number of parcels) significantly degrades overall compression. Examples described herein avoid such degradation in overall compression for neural network based coding (e.g., video encoding and decoding).

Figure 9:
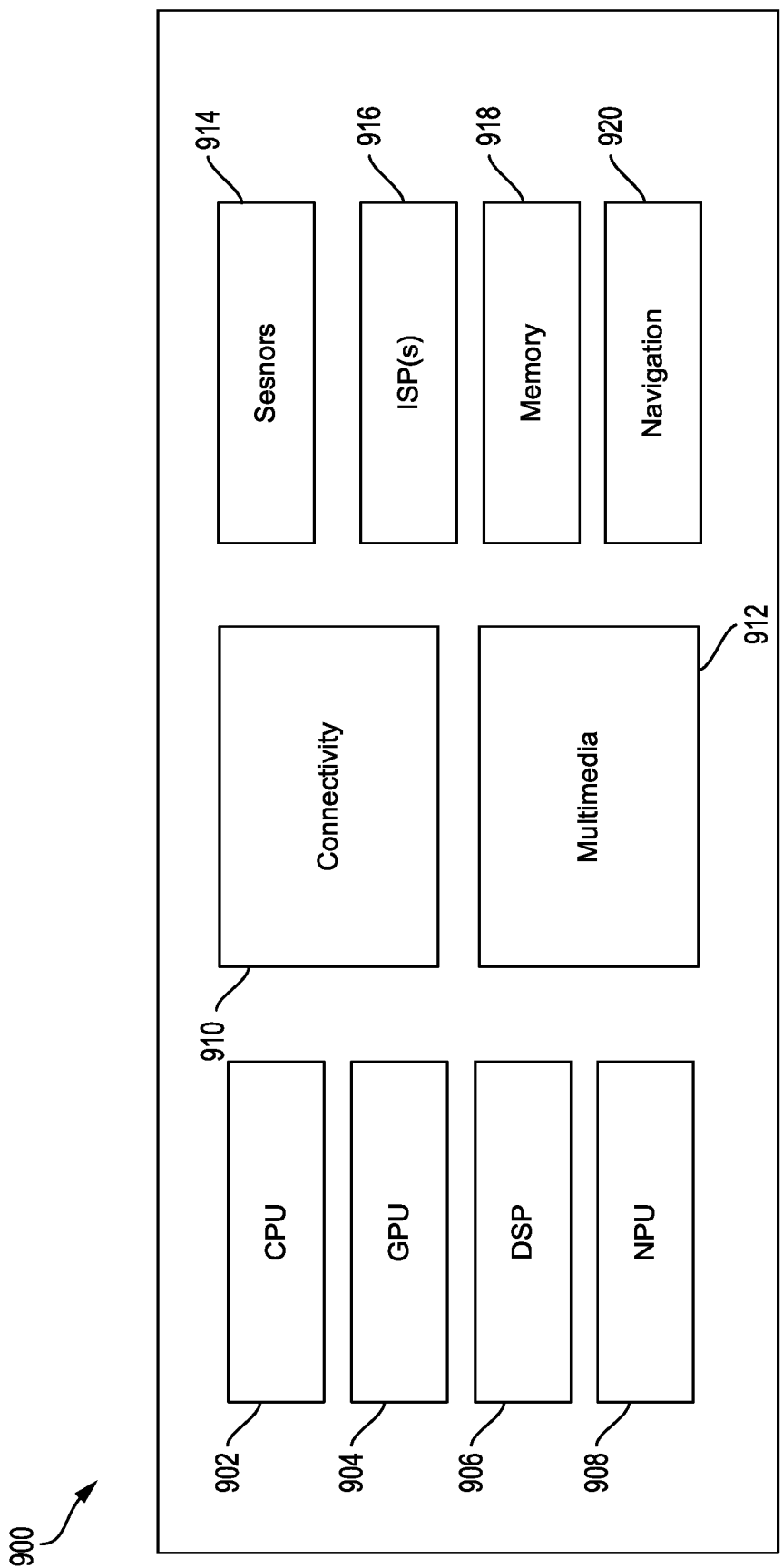
FIG. 9 illustrates an example system that can be used with neural network systems for encoding video data, in accordance with examples described herein.

FIG. 9 illustrates an example implementation of a system-on-a-chip (SOC) 900, which may include a central processing unit (CPU) 902 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 908, in a memory block associated with a CPU 902, in a memory block associated with a graphics processing unit (GPU) 904, in a memory block associated with a digital signal processor (DSP) 906, in a memory block 918, and/or may be distributed across multiple blocks. Instructions executed at the CPU 902 may be loaded from a program memory associated with the CPU 902 or may be loaded from a memory block 918.

The SOC 900 may also include additional processing blocks tailored to specific functions, such as a GPU 904, a DSP 906, a connectivity block 910, which may include fifth generation (5G) connectivity, fourth generation long term evolution (4G LTE) connectivity, Wi-Fi connectivity, USB connectivity, Bluetooth™ connectivity, and the like, and a multimedia processor 912 that may, for example, detect and recognize gestures. In one implementation, the NPU is implemented in the CPU 902, DSP 906, and/or GPU 904. The SOC 900 may also include a sensor processor 914, image signal processors (ISPs) 916, and/or navigation module 920, which may include a global positioning system.

In some examples, the SOC 900 may be based on an ARM instruction set. In an aspect of the present disclosure, the instructions loaded into the CPU 902 may comprise code to search for a stored multiplication result in a lookup table (LUT) corresponding to a multiplication product of an input value and a filter weight. The instructions loaded into the CPU 902 may also comprise code to disable a multiplier during a multiplication operation of the multiplication product when a lookup table hit of the multiplication product is detected. In addition, the instructions loaded into the CPU 902 may comprise code to store a computed multiplication product of the input value and the filter weight when a lookup table miss of the multiplication product is detected.

SOC 900 and/or components thereof may be configured to perform video compression and/or decompression (also referred to as video encoding and/or decoding, collectively referred to as video coding) using machine learning techniques according to aspects of the present disclosure discussed herein. By using deep learning architectures to perform video compression and/or decompression, aspects of the present disclosure can increase the efficiency of video compression and/or decompression on a device. For example, a device using the video coding techniques described can compress video more efficiently using the machine learning based techniques, can transmit the compressed video to another device, and the other device can decompress the compressed video more efficiently using the machine learning based techniques described herein.

As noted above, a neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 10A:
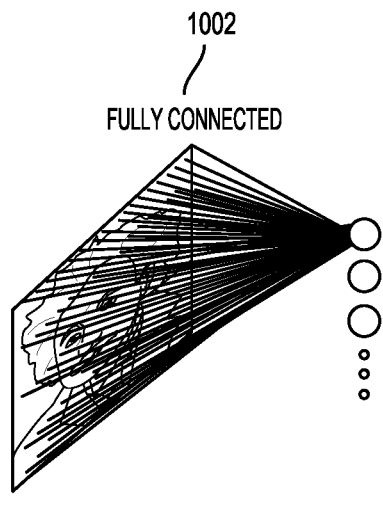
FIG. 10A illustrates an example of a fully connected neural network, in accordance with examples described herein.
Figure 10B:
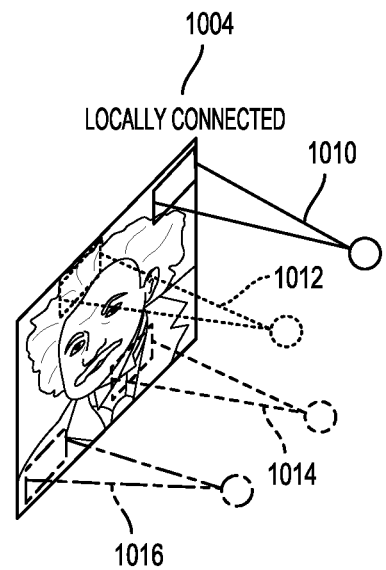
FIG. 10B illustrates an example of a locally connected neural network, in accordance with examples described herein.

The connections between layers of a neural network may be fully connected or locally connected. FIG. 10A illustrates an example of a fully connected neural network 1002. In a fully connected neural network 1002, a neuron in a first layer may communicate its output to every neuron in a second layer, so that each neuron in the second layer will receive input from every neuron in the first layer. FIG. 10B illustrates an example of a locally connected neural network 1004. In a locally connected neural network 1004, a neuron in a first layer may be connected to a limited number of neurons in the second layer. More generally, a locally connected layer of the locally connected neural network 1004 may be configured so that each neuron in a layer will have the same or a similar connectivity pattern, but with connections strengths that may have different values (e.g., 1010, 1012, 1014, and 1016). The locally connected connectivity pattern may give rise to spatially distinct receptive fields in a higher layer, because the higher layer neurons in a given region may receive inputs that are tuned through training to the properties of a restricted portion of the total input to the network.

Figure 10C:
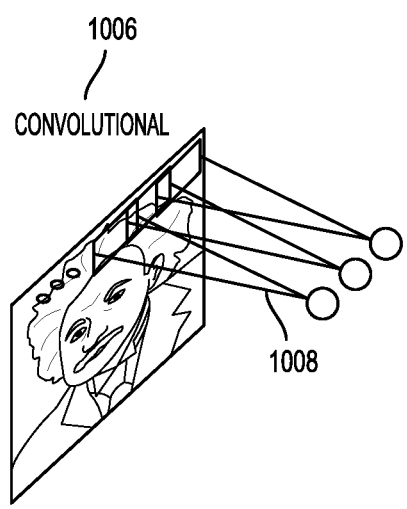
FIG. 10C illustrates an example of a convolutional neural network, in accordance with examples described herein.

One example of a locally connected neural network is a convolutional neural network. FIG. 10C illustrates an example of a convolutional neural network 1006. The convolutional neural network 1006 may be configured such that the connection strengths associated with the inputs for each neuron in the second layer are shared (e.g., 1008). Convolutional neural networks may be well suited to problems in which the spatial location of inputs is meaningful. Convolutional neural network 1006 may be used to perform one or more aspects of video compression and/or decompression, according to aspects of the present disclosure.

Figure 10D:
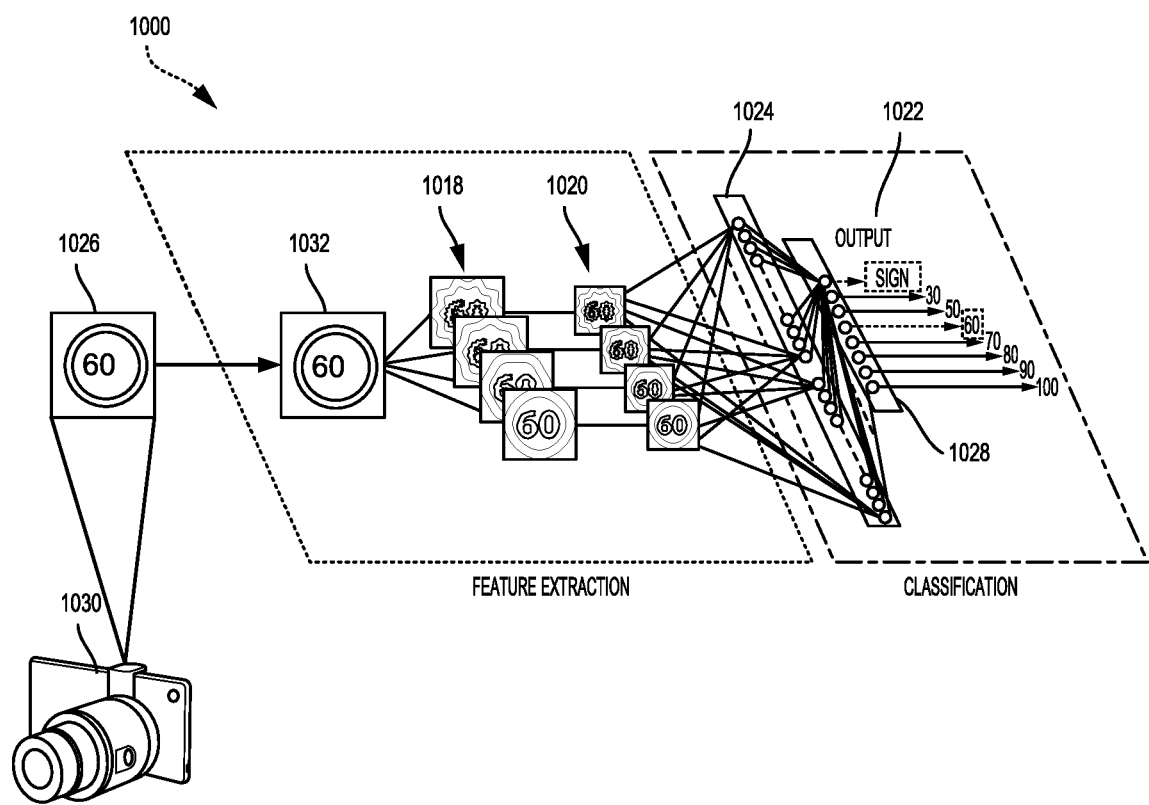
FIG. 10D illustrates a detailed example of a deep convolutional network (DCN) designed to recognize visual features from an image, in accordance with examples described herein.

One type of convolutional neural network is a deep convolutional network (DCN). FIG. 10D illustrates a detailed example of a DCN 1000 designed to recognize visual features from an image 1026 input from an image capturing device 1030, such as a car-mounted camera. The DCN 1000 of the current example may be trained to identify traffic signs and a number provided on the traffic sign. Of course, the DCN 1000 may be trained for other tasks, such as identifying lane markings or identifying traffic lights.

The DCN 1000 may be trained with supervised learning. During training, the DCN 1000 may be presented with an image, such as the image 1026 of a speed limit sign, and a forward pass may then be computed to produce an output 1022. The DCN 1000 may include a feature extraction section and a classification section. Upon receiving the image 1026, a convolutional layer 1032 may apply convolutional kernels (not shown) to the image 1026 to generate a first set of feature maps 1018. As an example, the convolutional kernel for the convolutional layer 1032 may be a 5×5 kernel that generates 108×28 feature maps. In the present example, because four different feature maps are generated in the first set of feature maps 1018, four different convolutional kernels were applied to the image 1026 at the convolutional layer 1032. The convolutional kernels may also be referred to as filters or convolutional filters.

The first set of feature maps 1018 may be subsampled by a max pooling layer (not shown) to generate a second set of feature maps 1020. The max pooling layer reduces the size of the first set of feature maps 1018. That is, a size of the second set of feature maps 1020, such as 94×14, is less than the size of the first set of feature maps 1018, such as 108×28. The reduced size provides similar information to a subsequent layer while reducing memory consumption. The second set of feature maps 1020 may be further convolved via one or more subsequent convolutional layers (not shown) to generate one or more subsequent sets of feature maps (not shown).

In the example of FIG. 10D, the second set of feature maps 1020 is convolved to generate a first feature vector 1024. Furthermore, the first feature vector 1024 is further convolved to generate a second feature vector 1028. Each feature of the second feature vector 1028 may include a number that corresponds to a possible feature of the image 1026, such as "sign," "60," and "100." A softmax function (not shown) may convert the numbers in the second feature vector 1028 to a probability. As such, an output 1022 of the DCN 1000 is a probability of the image 1026 including one or more features.

In the present example, the probabilities in the output 1022 for "sign" and "60" are higher than the probabilities of the others of the output 1022, such as "30," "40," "50," "70," "80," "90," and "100". Before training, the output 1022 produced by the DCN 1000 is likely to be incorrect. Thus, an error may be calculated between the output 1022 and a target output. The target output is the ground truth of the image 1026 (e.g., "sign" and "60"). The weights of the DCN 1000 may then be adjusted so the output 1022 of the DCN 1000 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 1022 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 1020) receiving input from a range of neurons in the previous layer (e.g., feature maps 1018) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction.

Figure 11:
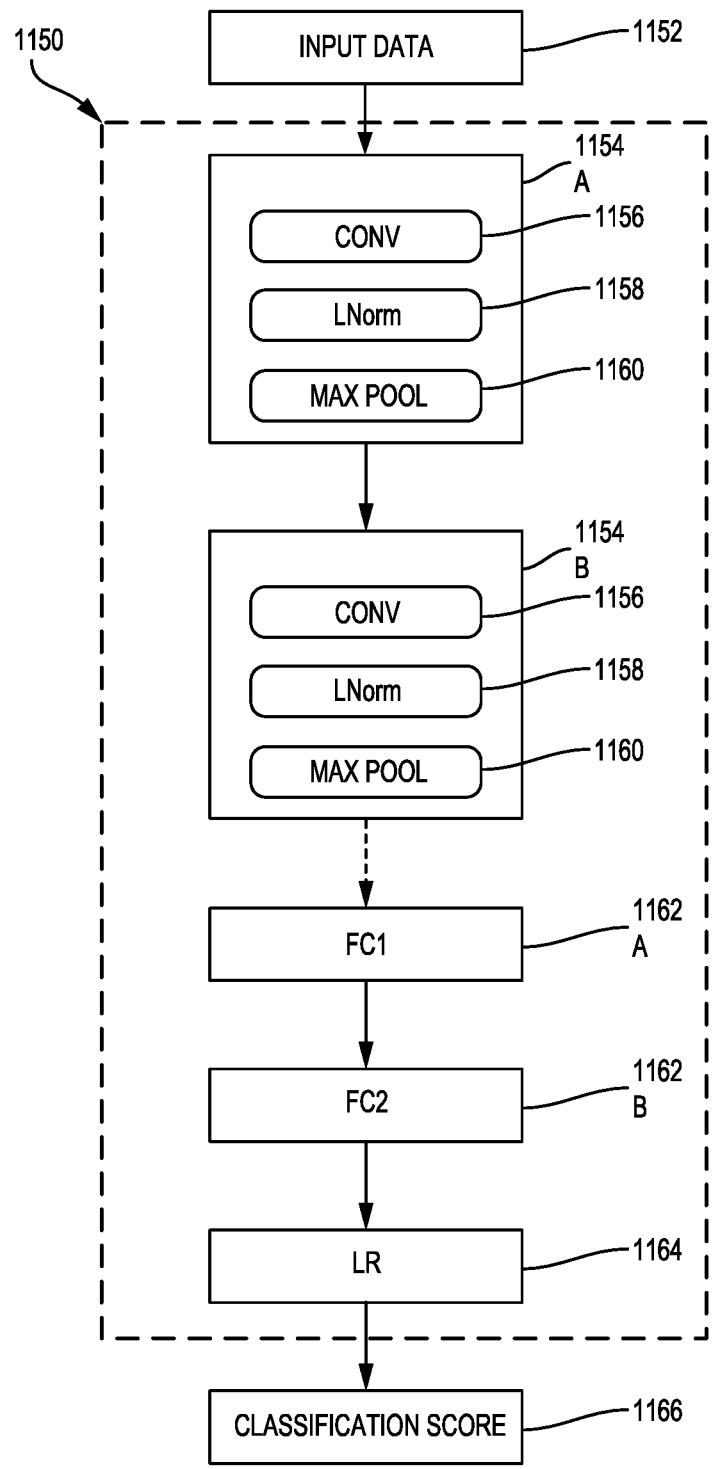
FIG. 11 is a block diagram illustrating a deep convolutional network (DCN), in accordance with examples described herein.

FIG. 11 is a block diagram illustrating an example of a deep convolutional network 1150. The deep convolutional network 1150 may include multiple different types of layers based on connectivity and weight sharing. As shown in FIG. 11, the deep convolutional network 1150 includes the convolution blocks 1154A, 1154B. Each of the convolution blocks 1154A, 1154B may be configured with a convolution layer (CONN) 1156, a normalization layer (LNorm) 1158, and a max pooling layer (MAX POOL) 1160.

The convolution layers 1156 may include one or more convolutional filters, which may be applied to the input data 1152 to generate a feature map. Although only two convolution blocks 1154A, 1154B are shown, the present disclosure is not so limiting, and instead, any number of convolution blocks (e.g., blocks 1154A, 1154B) may be included in the deep convolutional network 1150 according to design preference. The normalization layer 1158 may normalize the output of the convolution filters. For example, the normalization layer 1158 may provide whitening or lateral inhibition. The max pooling layer 1160 may provide down sampling aggregation over space for local invariance and dimensionality reduction.

The parallel filter banks, for example, of a deep convolutional network may be loaded on a CPU 902 or GPU 904 of an SOC 900 to achieve high performance and low power consumption. In alternative embodiments, the parallel filter banks may be loaded on the DSP 906 or an ISP 916 of an SOC 900. In addition, the deep convolutional network 1150 may access other processing blocks that may be present on the SOC 900, such as sensor processor 914 and navigation module 920, dedicated, respectively, to sensors and navigation.

The deep convolutional network 1150 may also include one or more fully connected layers, such as layer 1162A (labeled "FC1") and layer 1162B (labeled "FC2"). The deep convolutional network 1150 may further include a logistic regression (LR) layer 1164. Between each layer 1156, 1158, 1160, 1162A, 1162B, 1164 of the deep convolutional network 1150 are weights (not shown) that are to be updated. The output of each of the layers (e.g., 1156, 1158, 1160, 1162A, 1162B, 1164) may serve as an input of a succeeding one of the layers (e.g., 1156, 1158, 1160, 1162A, 1162B, 1164) in the deep convolutional network 1150 to learn hierarchical feature representations from input data 1152 (e.g., images, audio, video, sensor data and/or other input data) supplied at the first of the convolution blocks 1154A. The output of the deep convolutional network 1150 is a classification score 1166 for the input data 1152. The classification score 1166 may be a set of probabilities, where each probability is the probability of the input data including a feature from a set of features.

As noted above, digital video data can include large amounts of data, which can place a significant burden on communication networks as well as on devices that process and store the video data. For instance, recording uncompressed video content generally results in large file sizes that greatly increase as the resolution of the recorded video content increases. In one illustrative example, uncompressed 16-bit per channel video recorded in 1080p/24 (e.g. a resolution of 1920 pixels in width and 1080 pixels in height, with 24 frames per second captured) may occupy 12.4 megabytes per frame, or 297.6 megabytes per second. Uncompressed 16-bit per channel video recorded in 12K resolution at 24 frames per second may occupy 129.8 megabytes per frame, or 1195.2 megabytes per second.

Network bandwidth is another constraint for which large video files can become problematic. For example, video content is oftentimes delivered over wireless networks (e.g., via LTE, LTE-Advanced, New Radio (NR), WiFi™, Bluetooth™, or other wireless networks), and can make up a large portion of consumer internet traffic. Despite advances in the amount of available bandwidth in wireless networks, it may still be desirable to reduce the amount of bandwidth used to deliver video content in these networks.

Because uncompressed video content can result in large files that may involve sizable memory for physical storage and considerable bandwidth for transmission, video coding techniques can be utilized to compress and then decompress such video content.

To reduce the size of video content—and thus the amount of storage involved to store video content—and the amount of bandwidth involved in delivering video content, various video coding techniques can be performed according to a particular video coding Standard, such as HEVC, AVC, MPEG, VVC, among others. Video coding often uses prediction methods such as inter-prediction or intra-prediction, which take advantage of redundancies present in video images or sequences. A common goal of video coding techniques is to compress video data into a form that uses a lower bit rate, while avoiding or minimizing degradations in the video quality. As the demand for video services grows and new video services become available, coding techniques with better coding efficiency, performance, and rate control are needed.

In general, an encoding device encodes video data according to a video coding Standard to generate an encoded video bitstream. In some examples, an encoded video bitstream (or "video bitstream" or "bitstream") is a series of one or more coded video sequences. The encoding device can generate coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. In HEVC, the slices are partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy (IBC) prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

Transformations may be performed using TUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoding device.

Once the pictures of the video data are partitioned into CUs, the encoding device predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

After performing prediction using intra- and/or inter-prediction, the encoding device can perform transformation and quantization. For example, following prediction, the encoding device may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoding device can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 112×112, 16×16, 8×8, 12×12, or other suitable size) may be applied to residual data in each CU. In some embodiments, a TU may be used for the transform and quantization processes implemented by the encoding device. A given CU having one or more PUs may also include one or more TUs. As described in further detail below, the residual values may be transformed into transform coefficients using the block transforms, and then may be quantized and scanned using TUs to produce serialized transform coefficients for entropy coding.

The encoding device may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoding device. In some examples, the encoding device may utilize a predefined scan order to scan the quantized transform coefficients to produce a serialized vector that can be entropy encoded. In some examples, encoding device may perform an adaptive scan. After scanning the quantized transform coefficients to form a vector (e.g., a one-dimensional vector), the encoding device may entropy encode the vector. For example, the encoding device may use context adaptive variable length coding, context adaptive binary arithmetic coding, syntax-based context-adaptive binary arithmetic coding, probability interval partitioning entropy coding, or another suitable entropy encoding technique.

The encoding device can store the encoded video bitstream and/or can send the encoded video bitstream data over a communications link to a receiving device, which can include a decoding device. The decoding device may decode the encoded video bitstream data by entropy decoding (e.g., using an entropy decoder) and extracting the elements of one or more coded video sequences making up the encoded video data. The decoding device may then rescale and perform an inverse transform on the encoded video bitstream data. Residual data is then passed to a prediction stage of the decoding device. The decoding device then predicts a block of pixels (e.g., a PU) using intra-prediction, inter-prediction, IBC, and/or other type of prediction. In some examples, the prediction is added to the output of the inverse transform (the residual data). The decoding device may output the decoded video to a video destination device, which may include a display or other output device for displaying the decoded video data to a consumer of the content.

Illustrative aspects of the disclosure include:

Aspect 1. An apparatus for encoding video data, the apparatus comprising:
memory; and one or more processors coupled to the memory, the one or more processors configured to: obtain a sequence of video data; identify positions in the sequence of video data associated with entry points for individually entropy codable parcels of a parallel entropy codable sequence of video data; generate the parallel entropy codable sequence of video data; and generate an index for the parallel entropy codable sequence of video data, the index identifying the individually entropy codable parcels within the parallel entropy codable sequence of video data.

Aspect 2A. An apparatus according to aspect 1, wherein the index is generated by sequentially increasing the number of bits used for coding values from $\lfloor \log_2(N_p) \rfloor$ bits to $\lfloor \log_2(N_p) \rfloor + 1$, in the first and last values in the set of possible values for the sequence of video data.

Aspect 2B. The apparatus of aspect 1, wherein the entry points are identified at least in part by performing a bisection enumeration of the sequence of video data.

Aspect 3. The apparatus of aspect 2B, wherein the parallel entropy codable sequence of video data is generated at least in part by performing a bisection search that encodes information associated with the individually entropy codable parcels with data from the sequence of video data determined by the positions to generate the individually entropy codable parcels.

Aspect 4. The apparatus of aspect 3, wherein, to perform the bisection enumeration, the one or more processors are configured to: bisect the sequence of video data to identify an initial position of the positions, wherein the initial position is associated with a first entry point and subsequences divided by the initial position; and bisect tiers of subsequences to identify a remaining portion of the positions.

Aspect 5. The apparatus of aspect 3, wherein the individually entropy codable parcels include corresponding data from the sequence of video data determined by the positions, and the information about the individually entropy codable parcels.

Aspect 6. The apparatus of aspect 5, wherein the information about the individually entropy codable parcels is information about a magnitude of a binary representation of the corresponding data from the sequence of video data.

Aspect 7. The apparatus of aspect 3, wherein a difference between a largest parcel and a smallest parcel of the individually entropy codable parcels is less than a threshold difference.

Aspect 8. The apparatus of aspect 3, wherein, to generate the parallel entropy codable sequence, the one or more processors are configured to:
identify a number of parcels to define a set of individually entropy codable parcels from a first parcel to a last parcel having sizes between a minimum parcel size and a maximum parcel size, wherein parcel sizes of the number of parcels sums to a size of the parallel entropy codable sequence.

Aspect 9. The apparatus of aspect 8, wherein, to generate the parallel entropy codable sequence of video data, the one or more processors are configured to
initialize a stack in the memory including a number of parcels and a magnitude of a binary representation of corresponding data for the number of parcels; and generate the parallel entropy codable sequence of video data at least in part by performing following operations until the stack is empty: analyze the stack to retrieve current interval sets; select a parcel by defining a new index for the parcel as an average of the current interval sets; use bisection to encode bits of the parcel using the average of the current interval sets; update the stack with sets from the first parcel to the parcel when the parcel is not the first parcel; and update the stack with sets from the parcel to the last parcel when the parcel using is not the last parcel.

Aspect 10. The apparatus of aspect 9, wherein the stack is further initialized with a universal codeword set.

Aspect 11. The apparatus of aspect 9, wherein, to use bisection to encode the bits of the parcel, the one or more processors are configured to: initialize a first variable to the minimum parcel size, a second variable to the maximum parcel size, and a third variable to an average of the minimum parcel size and the maximum parcel size; access a value for a magnitude of a binary representation of the parcel; encode a first bit when the third variable is less than or equal to the value; encode a second bit when the third variable is greater than the value; and update the third variable to a new average of the first variable and the second variable.

Aspect 12. The apparatus of aspect 3, wherein the one or more processors are further configured to: define parcels of the individually entropy codable parcels as forward parcels or backwards parcels; wherein a corresponding parcel pair includes a corresponding forward parcel and a corresponding backwards parcel defined using a single shared entry point in the index.

Aspect 13. The apparatus of aspect 11, wherein the index includes N/2 entry points when a number of the individually entropy codable parcels is even, and the index includes [(N−1)/2]+1 entry points when the number of the individually entropy codable parcels is odd.

Aspect 14. The apparatus of aspect 11, wherein the one or more processors are further configured to: store the individually entropy codable parcels in the memory structured as a file having a file structure including the index and a plurality of parts, each part including a plurality of blocks, each block including a plurality of sections, and each section including a forward parcel structure and a backward parcel structure for the corresponding forward parcel and the corresponding backwards parcel of the corresponding parcel pair.

Aspect 15. The apparatus of aspect 13, wherein the one or more processors are further configured to transmit the file including the index and the individually entropy codable parcels.

Aspect 16. The apparatus of aspect 3, wherein the index identifies the individually entropy codable parcels using the entry points as identified following encoding of the sequence of video data in an encoded bitstream.

Aspect 17. The apparatus of aspect 3, wherein the index identifies the individually entropy codable parcels including identifying a bit length and a position of each parcel in an encoded video bitstream generated from the sequence of video data.

Aspect 18. The apparatus of aspect 3, further comprising a transmitter coupled to the one or more processors and configured to transmit the sequence of video data as entropy encoded using the index and the individually entropy codable parcels.

Aspect 19. The apparatus of aspect 3, further comprising a display coupled to the one or more processors and configured to display images of the sequence of video data.

Aspect 20. A computer-implemented method comprising: obtaining a sequence of video data; identifying positions in the sequence of video data associated with entry points for individually entropy codable parcels of a parallel entropy codable sequence of video data; generating the parallel entropy codable sequence of video data; and generating an index for the parallel entropy codable sequence of video data, the index identifying the individually entropy codable parcels within the parallel entropy codable sequence of video data.

Aspect 21. The computer-implemented method of aspect 20, wherein the entry points are identified at least in part by performing a bisection enumeration of the sequence of video data; and wherein the parallel entropy codable sequence of video data is generated at least in part by performing a bisection search that encodes information associated with the individually entropy codable parcels with data from the sequence of video data determined by the positions to generate the individually entropy codable parcels.

Aspect 22. The computer-implemented method of aspect 21, wherein, to perform the bisection enumeration, the one or more processors are configured to: bisect the sequence of video data to identify an initial position of the positions, wherein the initial position is associated with a first entry point and subsequences divided by the initial position; and bisect tiers of subsequences to identify a remaining portion of the positions.

Aspect 23. The computer-implemented method of aspect 21, wherein the individually entropy codable parcels include corresponding data from the sequence of video data determined by the positions, and the information about the individually entropy codable parcels.

Aspect 24. The computer-implemented method of aspect 21, wherein the information about the individually entropy codable parcels is information about a magnitude of a binary representation of the corresponding data from the sequence of video data.

Aspect 25. The computer-implemented method of aspect 21, wherein, to generate the parallel entropy codable sequence, the one or more processors are configured to: identify a number of parcels to define a set of individually entropy codable parcels from a first parcel to a last parcel having sizes between a minimum parcel size and a maximum parcel size, wherein parcel sizes of the number of parcels sums to a size of the parallel entropy codable sequence.

Aspect 26. The computer-implemented method of aspect 25, wherein, to generate the parallel entropy codable sequence of video data, the one or more processors are configured to initialize a stack in the memory including a number of parcels and a magnitude of a binary representation of corresponding data for the number of parcels; and generate the parallel entropy codable sequence of video data at least in part by performing following operations until the stack is empty: analyze the stack to retrieve current interval sets; select a parcel by defining a new index for the parcel as an average of the current interval sets; use bisection to encode bits of the parcel using the average of the current interval sets; update the stack with sets from the first parcel to the parcel when the parcel is not the first parcel; and update the stack with sets from the parcel to the last parcel when the parcel using is not the last parcel.

Aspect 27. The computer-implemented method of aspect 25, wherein, to use bisection to encode the bits of the parcel, the one or more processors are configured to: initialize a first variable to the minimum parcel size, a second variable to the maximum parcel size, and a third variable to an average of the minimum parcel size and the maximum parcel size; access a value for a magnitude of a binary representation of the parcel; encode a first bit when the third variable is less than or equal to the value; encode a second bit when the third variable is greater than the value; and update the third variable to a new average of the first variable and the second variable.

Aspect 28. The computer-implemented method of aspect 27, further comprising transmitting the file including the index and the individually entropy codable parcels.

Aspect 29. An apparatus for decoding video data, the apparatus comprising:
memory; and one or more processors coupled to the memory, the one or more processors configured to: obtain a stream of encoded video data including an index and a parallel entropy codable sequence of video data, the parallel entropy codable sequence of video data including individually entropy codable parcels identifiable using the index; decode the index for data associated with the individually entropy codable parcels; identify the individually entropy codable parcels from the stream of encoded video data using the data from the index; and
decode the individually entropy codable parcels from the stream of encoded video data in parallel using the data as decoded from the index.

Aspect 30. A computer-implemented method comprising: obtaining a stream of encoded video data including an index and a parallel entropy codable sequence of video data, the parallel entropy codable sequence of video data including individually entropy codable parcels identifiable using the index; decoding the index for data associated with the individually entropy codable parcels; identifying the individually entropy codable parcels from the stream of encoded video data using the data from the index; and decoding the individually entropy codable parcels from the stream of encoded video data in parallel using the data as decoded from the index.

Aspect 31. An apparatus for encoding video data, the apparatus comprising: means for obtaining a sequence of video data; means for identifying positions in the sequence of video data associated with entry points for individually entropy codable parcels of a parallel entropy codable sequence of video data; means for generating the parallel entropy codable sequence of video data; and means for generating an index for the parallel entropy codable sequence of video data, the index identifying the individually entropy codable parcels within the parallel entropy codable sequence of video data.

Aspect 32. The apparatus of aspect 31, further comprising means for performing a bisection enumeration of the sequence of video data.

Aspect 33. The apparatus of aspect 32, further comprising means for generating the parallel entropy codable sequence of video data with means for performing a bisection search that encodes information associated with the individually entropy codable parcels with data from the sequence of video data determined by the positions to generate the individually entropy codable parcels.

Aspect 34. The apparatus of aspect 32, further comprising means for performing any operation according to aspects 1-33 above.

Aspect 35. A non-transitory computer readable medium comprising instructions that, when executed by one or more processors, causes a device to perform the operations of any of aspects 1-33 above.

Figure 12:
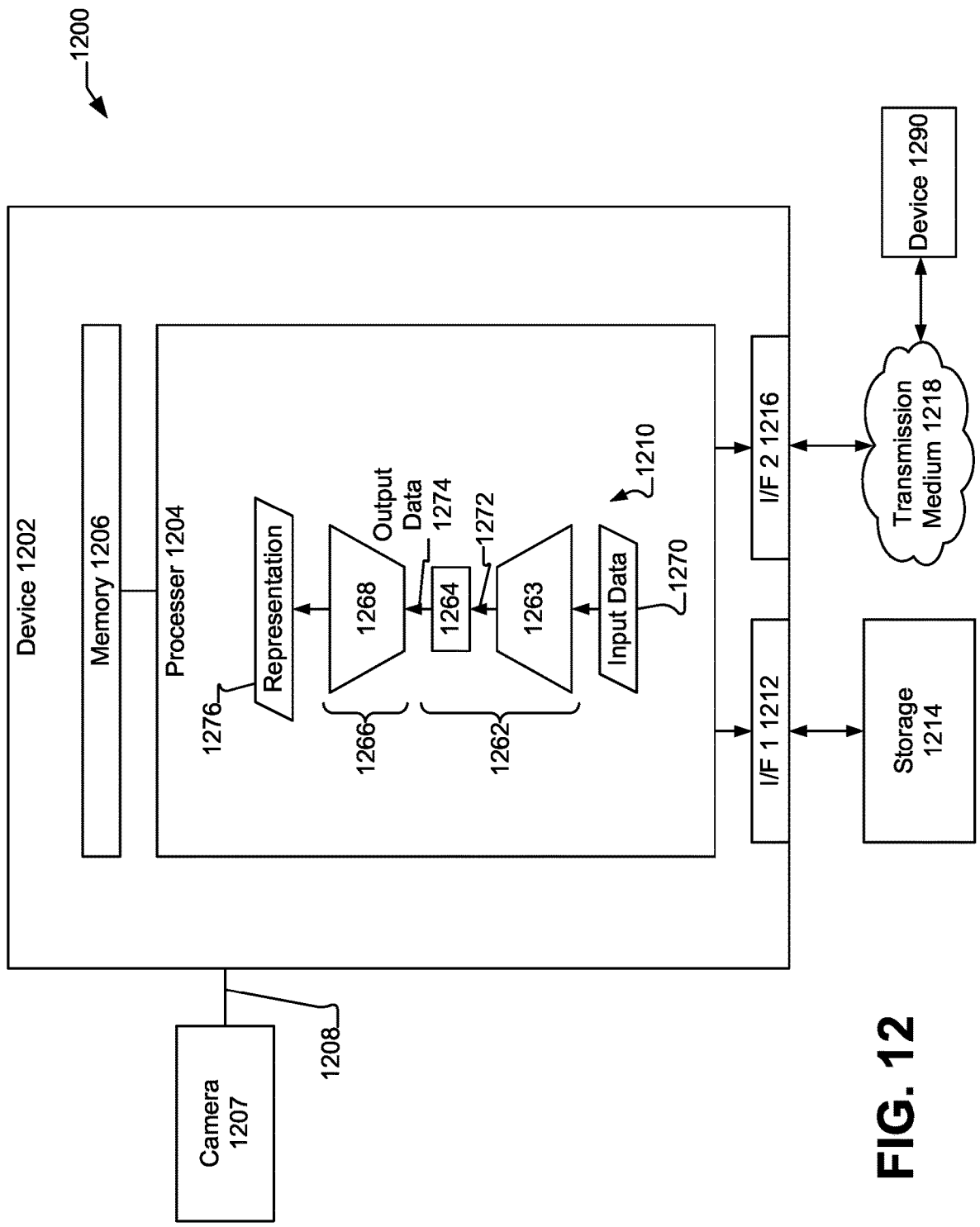
FIG. 12 is a diagram illustrating an example of a system including a device operable to perform image and/or video coding (encoding and decoding) using a neural network-based system, in accordance with some examples.

FIG. 12 depicts a system 1200 that includes a device 1202 configured to perform video encoding and decoding system 1210. The device 1202 is coupled to a camera 1207 and a storage medium 1214 (e.g., a data storage device). In some implementations, the camera 1207 is configured to provide the image data 1208 (e.g., a video data stream) to the processor 1204 for encoding by the system 1210. In some implementations, the device 1202 can be coupled to and/or can include multiple cameras (e.g., a dual-camera system, three cameras, or other number of cameras). In some cases, the device 1202 can be coupled to a microphone and/or other input device (e.g., a keyboard, a mouse, a touch input device such as a touchscreen and/or touchpad, and/or other input device). In some examples, the camera 1207, the storage medium 1214, microphone, and/or other input device can be part of the device 1202.

The device 1202 is also coupled to a second device 1290 via a transmission medium 1218, such as one or more wireless networks, one or more wired networks, or a combination thereof. For example, the transmission medium 1218 can include a channel provided by a wireless network, a wired network, or a combination of a wired and wireless network. The transmission medium 1218 may form part of a packet-based network, such as a local area network, a wide-area network, or a global network such as the Internet. The transmission medium 1218 may include routers, switches, base stations, or any other equipment that may be useful to facilitate communication from the source device to the receiving device. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

The device 1202 includes one or more processors (referred to herein as "processor") 1204 coupled to a memory 1206, a first interface ("I/F 1") 1212, and a second interface ("I/F 2") 1216. The processor 1204 is configured to receive image data 1208 from the camera 1207, from the memory 1206, and/or from the storage medium 1214. The processor 1204 is coupled to the storage medium 1214 via the first interface 1212 (e.g., via a memory bus) and is coupled to the transmission medium 1218 via the second interface 1216 (e.g., a network interface device, a wireless transceiver and antenna, one or more other network interface devices, or a combination thereof).

The processor 1204 includes the system 1210. The system 1210 includes an encoder portion 1262 and a decoder portion 1266. In some implementations, the system 1210 can include one or more auto-encoders. The encoder portion 1262 is configured to receive input data 1270 and to process the input data 1270 to generate output data 1274 at least partially based on the input data 1270.

In some implementations, the encoder portion 1262 of the system 1210 is configured to perform lossy compression of the input data 1270 to generate the output data 1274, so that the output data 1274 has fewer bits than the input data 1270. The encoder portion 1262 can be trained to compress input data 1270 (e.g., images or video frames) without using motion compensation based on any previous representations (e.g., one or more previously reconstructed frames). For example, the encoder portion 1262 can compress a video frame using video data only from that video frame, and without using any data of previously reconstructed frames. Video frames processed by the encoder portion 1262 can be referred to herein as intra-predicted frame (I-frames).

In some implementations, the encoder portion 1262 of the system 1210 can be trained to compress input data 1270 (e.g., video frames) using motion compensation based on previous representations within an independently entropy codable parcel as described. For example, the encoder portion 1262 can compress a video frame using video data from that video frame and using data of previously reconstructed frames or from portions of a frame or other data that is part of a single parcel that can be processed in parallel as described above. Video frames processed by the encoder portion 1262 can be referred to herein as intra-predicted frame (P-frames). The motion compensation can be used to determine the data of a current frame by describing how the pixels from a previously reconstructed frame move into new positions in the current frame along with residual information.

As shown, the encoder portion 1262 of the system 1210 can include a neural network 1263 and a quantizer 1264. The neural network 1263 can include one or more convolutional neural networks (CNNs), one or more fully-connected neural networks, one or more gated recurrent units (GRUs), one or more Long short-term memory (LSTM) networks, one or more ConvRNNs, one or more ConvGRUs, one or more ConvLSTMs, one or more GANs, any combination thereof, and/or other types of neural network architectures that generate(s) intermediate data 1272. The intermediate data 1272 is input to the quantizer 1264.

The quantizer 1264 is configured to perform quantization and in some cases entropy coding of the intermediate data 1272 to produce the output data 1274. The output data 1274 can include the quantized (and in some cases entropy coded) data. The quantization operations performed by the quantizer 1264 can result in the generation of quantized codes (or data representing quantized codes generated by the system 1210) from the intermediate data 1272. The quantization codes (or data representing the quantized codes) can also be referred to as latent codes or as a latent (denoted as z). The entropy model that is applied to a latent can be referred to herein as a "prior". In some examples, the quantization and/or entropy coding operations can be performed using existing quantization and entropy coding operations that are performed when encoding and/or decoding video data according to existing video coding Standards. In some examples, the quantization and/or entropy coding operations can be done by the system 1210 after bisection operations to identify independently entropy codable parcels of video data. In one illustrative example, the system 1210 can be trained using supervised training, with residual data being used as input and quantized codes and entropy codes being used as known output (labels) during the training.

The decoder portion 1266 of the system 1210 is configured to receive the output data 1274 (e.g., directly from quantizer 1264 and/or from the storage medium 1214). The decoder portion 1266 can process the output data 1274 to generate a representation 1276 of the input data 1270 at least partially based on the output data 1274. In some examples, the decoder portion 1266 of the system 1210 includes a neural network 1268 that may include one or more CNNs, one or more fully-connected neural networks, one or more GRUs, one or more Long short-term memory (LSTM) networks, one or more ConvRNNs, one or more ConvGRUs, one or more ConvLSTMs, one or more GANs, any combination thereof, and/or other types of neural network architectures.

The processor 1204 is configured to send the output data 1274 to at least one of the transmission medium 1218 or the storage medium 1214. For example, the output data 1274 may be stored at the storage medium 1214 for later retrieval and decoding (or decompression) by the decoder portion 1266 to generate the representation 1276 of the input data 1270 as reconstructed data. The reconstructed data can be used for various purposes, such as for playback of video data that has been encoded/compressed to generate the output data 1274. In some implementations, the output data 1274 may be decoded at another decoder device that matches the decoder portion 1266 (e.g., in the device 1202, in the second device 1290, or in another device) to generate the representation 1276 of the input data 1270 as reconstructed data. For instance, the second device 1290 may include a decoder that matches (or substantially matches) the decoder portion 1266, and the output data 1274 may be transmitted via the transmission medium 1218 to the second device 1290. The second device 1290 can process the output data 1274 to generate the representation 1276 of the input data 1270 as reconstructed data.

The components of the system 1200 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

While the system 1200 is shown to include certain components, one of ordinary skill will appreciate that the system 1200 can include more or fewer components than those shown in FIG. 12. For example, the system 1200 can also include, or can be part of a computing device that includes, an input device and an output device (not shown). In some implementations, the system 1200 may also include, or can be part of a computing device that includes, one or more memory devices (e.g., one or more random access memory (RAM) components, read-only memory (ROM) components, cache memory components, buffer components, database components, and/or other memory devices), one or more processing devices (e.g., one or more CPUs, GPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 12.

In some implementations, the system 1200 can be implemented locally by and/or included in a computing device. For example, the computing device can include a mobile device, a personal computer, a tablet computer, a virtual reality (VR) device (e.g., a head-mounted display (HMD) or other VR device), an augmented reality (AR) device (e.g., an HMD, AR glasses, or other AR device), a wearable device, a server (e.g., in a software as a service (SaaS) system or other server-based system), a television, and/or any other computing device with the resource capabilities to perform the techniques described herein.

In one example, the system 1210 can be incorporated into a portable electronic device that includes the memory 1206 coupled to the processor 1204 and configured to store instructions executable by the processor 1204, and a wireless transceiver coupled to an antenna and to the processor 1204 and operable to transmit the output data 1274 to a remote device.

In some examples, the systems and techniques described herein can be used for other encoder-decoder sub-networks that use convolutional (e.g., CNN) and normalization stage combinations at the input of the neural network based coding system compatible with independently entropy codable parcel structures for parallel coding.

In some cases, the computing device or apparatus may include various components, such as one or more input devices, one or more output devices, one or more processors, one or more microprocessors, one or more microcomputers, one or more transmitters, receivers or combined transmitter-receivers (e.g., referred to as transceivers), one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), neural processing units (NPUs), and/or other suitable electronic circuits), and/or can include and/or be implemented using computer software, firmware, or any combination thereof, to perform the various operations described herein.

The processes 800 and 850 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein (including process 800, process 850, and/or other processes described herein) may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 13 illustrates an example computing device architecture 1300 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing device architecture 1300 can implement the system of FIG. 6. The components of computing device architecture 1300 are shown in electrical communication with each other using connection 1305, such as a bus. The example computing device architecture 1300 includes a processing unit (CPU or processor) 1310 and computing device connection 1305 that couples various computing device components including computing device memory 1315, such as read only memory (ROM) 1320 and random access memory (RAM) 1325, to processor 1310.

Computing device architecture 1300 can include a cache of high-speed memory connected directly with, in close proximity to, or integrated as part of processor 1310. Computing device architecture 1300 can copy data from memory 1315 and/or the storage device 1330 to cache 1312 for quick access by processor 1310. In this way, the cache can provide a performance boost that avoids processor 1310 delays while waiting for data. These and other modules can control or be configured to control processor 1310 to perform various actions. Other computing device memory 1315 may be available for use as well. Memory 1315 can include multiple different types of memory with different performance characteristics. Processor 1310 can include any general purpose processor and a hardware or software service, such as service 1 1332, service 2 1334, and service 3 1336 stored in storage device 1330, configured to control processor 1310 as well as a special-purpose processor where software instructions are incorporated into the processor design. Processor 1310 may be a self-contained system, containing multiple cores or processors, a bus, memory controller, cache, etc. A multi-core processor may be symmetric or asymmetric.

To enable user interaction with the computing device architecture 1300, input device 1345 can represent any number of input mechanisms, such as a microphone for speech, a touch-sensitive screen for gesture or graphical input, keyboard, mouse, motion input, speech and so forth. Output device 1335 can also be one or more of a number of output mechanisms known to those of skill in the art, such as a display, projector, television, speaker device, etc. In some instances, multimodal computing devices can enable a user to provide multiple types of input to communicate with computing device architecture 1300. Communication interface 1340 can generally govern and manage the user input and computing device output. There is no restriction on operating on any particular hardware arrangement and therefore the basic features here may easily be substituted for improved hardware or firmware arrangements as they are developed.

Storage device 1330 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1325, read only memory (ROM) 1320, and hybrids thereof. Storage device 1330 can include services 1332, 1334, 1336 for controlling processor 1310. Other hardware or software modules are contemplated. Storage device 1330 can be connected to the computing device connection 1305. In one aspect, a hardware module that performs a particular function can include the software component stored in a computer-readable medium in connection with the necessary hardware components, such as processor 1310, connection 1305, output device 1335, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors, and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific embodiments. For example, a system may be implemented on one or more printed circuit boards or other substrates, and may have movable or static components. While the descriptions and examples herein use the term "system" to describe various aspects of this disclosure, the term "system" is not limited to a specific configuration, type, or number of objects.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the present disclosure are as follows:

Aspect 1: An apparatus for encoding video data, the apparatus comprising: memory; and one or more processors coupled to the memory, the one or more processors configured to: obtain a sequence of video data; identify positions in the sequence of video data associated with entry points for individually entropy codable parcels of a parallel entropy codable sequence of video data; generate the parallel entropy codable sequence of video data; and generate an index for the parallel entropy codable sequence of video data, the index identifying the individually entropy codable parcels within the parallel entropy codable sequence of video data.

Aspect 2: The apparatus of claim 1, wherein the entry points are identified at least in part by performing a bisection enumeration of the sequence of video data.

Aspect 3: The apparatus of claim 2, wherein the parallel entropy codable sequence of video data is generated at least in part by performing a bisection search that encodes information associated with the individually entropy codable parcels with data from the sequence of video data determined by the positions to generate the individually entropy codable parcels.

Aspect 4: The apparatus of claim 3, wherein, to perform the bisection enumeration, the one or more processors are configured to: bisect the sequence of video data to identify an initial position of the positions, wherein the initial position is associated with a first entry point and subsequences divided by the initial position; and bisect tiers of subsequences to identify a remaining portion of the positions.

Aspect 5: The apparatus of any one of claim 3 or 4, wherein the individually entropy codable parcels include corresponding data from the sequence of video data determined by the positions, and the information about the individually entropy codable parcels.

Aspect 6: The apparatus of claim 5, wherein the information about the individually entropy codable parcels is information about a magnitude of a binary representation of the corresponding data from the sequence of video data.

Aspect 7: The apparatus of any one of claims 1 to 6, wherein a difference between a largest parcel and a smallest parcel of the individually entropy codable parcels is less than a threshold difference.

Aspect 8: The apparatus of any one of claims 1 to 7, wherein, to generate the parallel entropy codable sequence, the one or more processors are configured to: identify a number of parcels to define a set of individually entropy codable parcels from a first parcel to a last parcel having sizes between a minimum parcel size and a maximum parcel size, wherein parcel sizes of the number of parcels sums to a size of the parallel entropy codable sequence.

Aspect 9: The apparatus of claim 8, wherein, to generate the parallel entropy codable sequence of video data, the one or more processors are configured to: initialize a stack in the memory including a number of parcels and a magnitude of a binary representation of corresponding data for the number of parcels; and generate the parallel entropy codable sequence of video data at least in part by performing following operations until the stack is empty: analyze the stack to retrieve current interval sets; select a parcel by defining a new index for the parcel as an average of the current interval sets; use bisection to encode bits of the parcel using the average of the current interval sets; update the stack with sets from the first parcel to the parcel when the parcel is not the first parcel; and update the stack with sets from the parcel to the last parcel when the parcel using is not the last parcel.

Aspect 10: The apparatus of claim 9, wherein the stack is further initialized with a universal codeword set.

Aspect 11: The apparatus of any one claim 9 or 10, wherein, to use bisection to encode the bits of the parcel, the one or more processors are configured to: initialize a first variable to the minimum parcel size, a second variable to the maximum parcel size, and a third variable to an average of the minimum parcel size and the maximum parcel size; access a value for a magnitude of a binary representation of the parcel; encode a first bit when the third variable is less than or equal to the value; encode a second bit when the third variable is greater than the value; and update the third variable to a new average of the first variable and the second variable.

Aspect 12: The apparatus of any one of claims 1 to 11, wherein the one or more processors are further configured to: define parcels of the individually entropy codable parcels as forward parcels or backwards parcels; wherein a corresponding parcel pair includes a corresponding forward parcel and a corresponding backwards parcel defined using a single shared entry point in the index.

Aspect 13: The apparatus of claim 12, wherein the index includes N/2 entry points when a number of the individually entropy codable parcels is even, and the index includes [(N−1)/2]+1 entry points when the number of the individually entropy codable parcels is odd.

Aspect 14: The apparatus of any one of claim 12 or 13, wherein the one or more processors are further configured to: store the individually entropy codable parcels in the memory structured as a file having a file structure including the index and a plurality of parts, each part including a plurality of blocks, each block including a plurality of sections, and each section including a forward parcel structure and a backward parcel structure for a corresponding forward parcel and the corresponding backwards parcel of the corresponding parcel pair.

Aspect 15: The apparatus of claim 14, wherein the one or more processors are further configured to transmit the file including the index and the individually entropy codable parcels.

Aspect 16: The apparatus of any one of claims 1 to 15, wherein the index identifies the individually entropy codable parcels using the entry points as identified following encoding of the sequence of video data in an encoded bitstream.

Aspect 17: The apparatus of any one of claims 1 to 16, wherein the index identifies the individually entropy codable parcels including identifying a bit length and a position of each parcel in an encoded video bitstream generated from the sequence of video data.

Aspect 18: The apparatus of any one of claims 1 to 17, further comprising a transmitter coupled to the one or more processors and configured to transmit the sequence of video data as entropy encoded using the index and the individually entropy codable parcels.

Aspect 19: The apparatus of any one of claims 1 to 18, further comprising a display coupled to the one or more processors and configured to display images of the sequence of video data.

Aspect 20: A method of encoding video data, comprising: obtaining a sequence of video data; identifying positions in the sequence of video data associated with entry points for individually entropy codable parcels of a parallel entropy codable sequence of video data; generating the parallel entropy codable sequence of video data; and generating an index for the parallel entropy codable sequence of video data, the index identifying the individually entropy codable parcels within the parallel entropy codable sequence of video data.

Aspect 21: The apparatus of claim 20, wherein the entry points are identified at least in part by performing a bisection enumeration of the sequence of video data.

Aspect 22: The apparatus of claim 21, wherein the parallel entropy codable sequence of video data is generated at least in part by performing a bisection search that encodes information associated with the individually entropy codable parcels with data from the sequence of video data determined by the positions to generate the individually entropy codable parcels.

Aspect 23: The apparatus of claim 22, wherein, to perform the bisection enumeration, the one or more processors are configured to: bisect the sequence of video data to identify an initial position of the positions, wherein the initial position is associated with a first entry point and subsequences divided by the initial position; and bisect tiers of subsequences to identify a remaining portion of the positions.

Aspect 24: The apparatus of any one of claim 22 or 23, wherein the individually entropy codable parcels include corresponding data from the sequence of video data determined by the positions, and the information about the individually entropy codable parcels.

Aspect 25: The apparatus of claim 24, wherein the information about the individually entropy codable parcels is information about a magnitude of a binary representation of the corresponding data from the sequence of video data.

Aspect 26: The apparatus of any one of claims 20 to 25, wherein a difference between a largest parcel and a smallest parcel of the individually entropy codable parcels is less than a threshold difference.

Aspect 27: The apparatus of any one of claims 20 to 26, wherein, to generate the parallel entropy codable sequence, the one or more processors are configured to: identify a number of parcels to define a set of individually entropy codable parcels from a first parcel to a last parcel having sizes between a minimum parcel size and a maximum parcel size, wherein parcel sizes of the number of parcels sums to a size of the parallel entropy codable sequence.

Aspect 28: The apparatus of claim 27, wherein, to generate the parallel entropy codable sequence of video data, the one or more processors are configured to: initialize a stack in the memory including a number of parcels and a magnitude of a binary representation of corresponding data for the number of parcels; and generate the parallel entropy codable sequence of video data at least in part by performing following operations until the stack is empty: analyze the stack to retrieve current interval sets; select a parcel by defining a new index for the parcel as an average of the current interval sets; use bisection to encode bits of the parcel using the average of the current interval sets; update the stack with sets from the first parcel to the parcel when the parcel is not the first parcel; and update the stack with sets from the parcel to the last parcel when the parcel using is not the last parcel.

Aspect 29: The apparatus of claim 28, wherein the stack is further initialized with a universal codeword set.

Aspect 30: The apparatus of any one claim 28 or 29, wherein, to use bisection to encode the bits of the parcel, the one or more processors are configured to: initialize a first variable to the minimum parcel size, a second variable to the maximum parcel size, and a third variable to an average of the minimum parcel size and the maximum parcel size;

access a value for a magnitude of a binary representation of the parcel; encode a first bit when the third variable is less than or equal to the value; encode a second bit when the third variable is greater than the value; and update the third variable to a new average of the first variable and the second variable.

Aspect 31: The apparatus of any one of claims 20 to 30, wherein the one or more processors are further configured to: define parcels of the individually entropy codable parcels as forward parcels or backwards parcels; wherein a corresponding parcel pair includes a corresponding forward parcel and a corresponding backwards parcel defined using a single shared entry point in the index.

Aspect 32: The apparatus of claim 31, wherein the index includes N/2 entry points when a number of the individually entropy codable parcels is even, and the index includes [(N−1)/2]+1 entry points when the number of the individually entropy codable parcels is odd.

Aspect 33: The apparatus of any one of claim 31 or 32, wherein the one or more processors are further configured to: store the individually entropy codable parcels in the memory structured as a file having a file structure including the index and a plurality of parts, each part including a plurality of blocks, each block including a plurality of sections, and each section including a forward parcel structure and a backward parcel structure for a corresponding forward parcel and the corresponding backwards parcel of the corresponding parcel pair.

Aspect 34: The apparatus of claim 33, wherein the one or more processors are further configured to transmit the file including the index and the individually entropy codable parcels.

Aspect 35: The apparatus of any one of claims 20 to 34, wherein the index identifies the individually entropy codable parcels using the entry points as identified following encoding of the sequence of video data in an encoded bitstream.

Aspect 36: The apparatus of any one of claims 20 to 35, wherein the index identifies the individually entropy codable parcels including identifying a bit length and a position of each parcel in an encoded video bitstream generated from the sequence of video data.

Aspect 37: The apparatus of any one of claims 20 to 36, further comprising a transmitter coupled to the one or more processors and configured to transmit the sequence of video data as entropy encoded using the index and the individually entropy codable parcels.

Aspect 38: The apparatus of any one of claims 20 to 37, further comprising a display coupled to the one or more processors and configured to display images of the sequence of video data.

Aspect 39: A non-transitory computer-readable medium having stored thereon instructions that, when executed by one or more processors, cause the one or more processors to perform operations according to any of aspects 1 to 38.

Aspect 40: An apparatus for encoding video data, comprising means for performing operations according to any of aspects 1 to 38.

Aspect 41: An apparatus for decoding video data, the apparatus comprising: memory; and one or more processors coupled to the memory, the one or more processors configured to: obtain a stream of encoded video data including an index and a parallel entropy codable sequence of video data, the parallel entropy codable sequence of video data including individually entropy codable parcels identifiable using the index; decode the index for data associated with the individually entropy codable parcels; identify the individually entropy codable parcels from the stream of encoded video data using the data from the index; and decode the individually entropy codable parcels from the stream of encoded video data in parallel using the data as decoded from the index.

Aspect 42: A computer-implemented method comprising: obtaining a stream of encoded video data including an index and a parallel entropy codable sequence of video data, the parallel entropy codable sequence of video data including individually entropy codable parcels identifiable using the index; decoding the index for data associated with the individually entropy codable parcels; identifying the individually entropy codable parcels from the stream of encoded video data using the data from the index; and decoding the individually entropy codable parcels from the stream of encoded video data in parallel using the data as decoded from the index.

Aspect 43: A non-transitory computer-readable medium having stored thereon instructions that, when executed by one or more processors, cause the one or more processors to perform operations according to any of aspects 1 to 38, 41, and 42.

Aspect 44: An apparatus for encoding video data, comprising means for performing operations according to any of aspects 1 to 38, 41, and 42.

What is claimed is:

1. An apparatus for encoding video data, the apparatus comprising:
   memory; and
   one or more processors coupled to the memory, the one or more processors configured to:
      obtain a sequence of video data;
      identify positions in the sequence of video data associated with entry points for individually entropy codable parcels of a parallel entropy codable sequence of video data;
      initialize a stack in the memory, the stack including a number of parcels and a magnitude of a binary representation of corresponding data for the number of parcels;
      for each parcel of the number of parcels, sequentially select a parcel from the stack by defining a corresponding index for each parcel, encode each parcel of the number of parcels as a respective entropy coded parcel, and update the stack based on each respective entropy coded parcel;
      generate the parallel entropy codable sequence of video data using each respective entropy coded parcel; and
      generate an index for the parallel entropy codable sequence of video data, the index identifying the individually entropy codable parcels within the parallel entropy codable sequence of video data using each corresponding index value for each parcel of the number of parcels.

2. The apparatus of claim 1, wherein the entry points are identified at least in part by performing a bisection enumeration of the sequence of video data.

3. The apparatus of claim 2, wherein the parallel entropy codable sequence of video data is generated at least in part by performing a bisection search that encodes information associated with the individually entropy codable parcels with data from the sequence of video data determined by the positions to generate the individually entropy codable parcels.

4. The apparatus of claim 3, wherein, to perform the bisection enumeration, the one or more processors are configured to:

bisect the sequence of video data to identify an initial position of the positions, wherein the initial position is associated with a first entry point and subsequences divided by the initial position; and bisect tiers of subsequences to identify a remaining portion of the positions.

5. The apparatus of claim 3, wherein the individually entropy codable parcels include corresponding data from the sequence of video data determined by the positions, and the information about the individually entropy codable parcels.

6. The apparatus of claim 5, wherein the information about the individually entropy codable parcels is information about a magnitude of a binary representation of the corresponding data from the sequence of video data.

7. The apparatus of claim 3, wherein a difference between a largest parcel and a smallest parcel of the individually entropy codable parcels is less than a threshold difference.

8. The apparatus of claim 3, wherein, to generate the parallel entropy codable sequence, the one or more processors are configured to:

identify a number of parcels to define a set of individually entropy codable parcels from a first parcel to a last parcel having sizes between a minimum parcel size and a maximum parcel size, wherein parcel sizes of the number of parcels sum to a size of the parallel entropy codable sequence.

9. The apparatus of claim 8, wherein the one or more processors are configured to:

select a parcel of the number of parcels by defining a new index for the parcel as an average of current interval sets;

use bisection to encode bits of the parcel using the average of the current interval sets;

update the stack with sets from the first parcel to the parcel when the parcel is not the first parcel; and update the stack with sets from the parcel to the last parcel when the parcel using is not the last parcel.

10. The apparatus of claim 9, wherein the stack is further initialized with a universal codeword set.

11. The apparatus of claim 9, wherein, to use bisection to encode the bits of the parcel, the one or more processors are configured to:

initialize a first variable to the minimum parcel size, a second variable to the maximum parcel size, and a third variable to an average of the minimum parcel size and the maximum parcel size;

access a value for a magnitude of a binary representation of the parcel;

encode a first bit when the third variable is less than or equal to the value;

encode a second bit when the third variable is greater than the value; and update the third variable to a new average of the first variable and the second variable.

12. The apparatus of claim 3, wherein the one or more processors are further configured to:

define parcels of the individually entropy codable parcels as forward parcels or backwards parcels;

wherein a corresponding parcel pair includes a corresponding forward parcel and a corresponding backwards parcel defined using a single shared entry point in the index.

13. The apparatus of claim 12, wherein the index includes N/2 entry points when a number of the individually entropy codable parcels is even, and the index includes [(N−1)/2]+1 entry points when the number of the individually entropy codable parcels is odd.

14. The apparatus of claim 12, wherein the one or more processors are further configured to:

store the individually entropy codable parcels in the memory structured as a file having a file structure including the index and a plurality of parts, each part including a plurality of blocks, each block including a plurality of sections, and each section including a forward parcel structure and a backward parcel structure for the corresponding forward parcel and the corresponding backwards parcel of the corresponding parcel pair.

15. The apparatus of claim 14, wherein the one or more processors are further configured to transmit the file including the index and the individually entropy codable parcels.

16. The apparatus of claim 3, wherein the index identifies the individually entropy codable parcels using the entry points as identified following encoding of the sequence of video data in an encoded bitstream.

17. The apparatus of claim 3, wherein the index identifies the individually entropy codable parcels including identifying a bit length and a position of each parcel in an encoded video bitstream generated from the sequence of video data.

18. The apparatus of claim 3, further comprising a transmitter coupled to the one or more processors and configured to transmit the sequence of video data as entropy encoded using the index and the individually entropy codable parcels.

19. The apparatus of claim 3, further comprising a display coupled to the one or more processors and configured to display images of the sequence of video data.

20. A computer-implemented method comprising:

obtaining a sequence of video data;

identifying positions in the sequence of video data associated with entry points for individually entropy codable parcels of a parallel entropy codable sequence of video data;

initializing a stack in a memory, the stack including a number of parcels and a magnitude of a binary representation of corresponding data for the number of parcels;

for each parcel of the number of parcels, sequentially selecting a parcel from the stack by defining a corresponding index for each parcel, encoding each parcel of the number of parcels as a respective entropy coded parcel, and updating the stack based on each respective entropy coded parcel;

generating the parallel entropy codable sequence of video data using each respective entropy coded parcel; and generating an index for the parallel entropy codable sequence of video data, the index identifying the individually entropy codable parcels within the parallel entropy codable sequence of video data using each corresponding index value for each parcel of the number of parcels.

21. The computer-implemented method of claim 20, wherein the entry points are identified at least in part by performing a bisection enumeration of the sequence of video data; and wherein the parallel entropy codable sequence of video data is generated at least in part by performing a bisection search that encodes information associated with the individually entropy codable parcels with data from the sequence of video data determined by the positions to generate the individually entropy codable parcels.

22. The computer-implemented method of claim 21, wherein performing the bisection enumeration includes:

bisecting the sequence of video data to identify an initial position of the positions, wherein the initial position is associated with a first entry point and subsequences divided by the initial position; and bisecting tiers of subsequences to identify a remaining portion of the positions.

23. The computer-implemented method of claim 21, wherein the individually entropy codable parcels include corresponding data from the sequence of video data determined by the positions, and the information about the individually entropy codable parcels.

24. The computer-implemented method of claim 21, wherein the information about the individually entropy codable parcels is information about a magnitude of a binary representation of the corresponding data from the sequence of video data.

25. The computer-implemented method of claim 21, wherein generating the parallel entropy codable sequence includes:

identifying a number of parcels to define a set of individually entropy codable parcels from a first parcel to a last parcel having sizes between a minimum parcel size and a maximum parcel size, wherein parcel sizes of the number of parcels sum to a size of the parallel entropy codable sequence.

26. The computer-implemented method of claim 25, further comprising:

selecting a parcel of the number of parcels by defining a new index for the parcel as an average of current interval sets;

using bisection to encode bits of the parcel using the average of the current interval sets;

updating the stack with sets from the first parcel to the parcel when the parcel is not the first parcel; and updating the stack with sets from the parcel to the last parcel when the parcel using is not the last parcel.

27. The computer-implemented method of claim 26, wherein using bisection to encode the bits of the parcel includes:

initializing a first variable to the minimum parcel size, a second variable to the maximum parcel size, and a third variable to an average of the minimum parcel size and the maximum parcel size;

accessing a value for a magnitude of a binary representation of the parcel;

encoding a first bit when the third variable is less than or equal to the value;

encoding a second bit when the third variable is greater than the value; and updating the third variable to a new average of the first variable and the second variable.

28. The computer-implemented method of claim 27, further comprising transmitting a file including the index and the individually entropy codable parcels.

* * * * *